United States Patent [19]
Das

[11] Patent Number: 5,550,550
[45] Date of Patent: Aug. 27, 1996

[54] HIGH EFFICIENCY SATELLITE MULTIBEAM EQUALLY LOADED TRANSMITTERS

[76] Inventor: Satyendranath Das, P.O. Box 574, Mt. View, Calif. 94042-0574

[21] Appl. No.: 511,532

[22] Filed: Aug. 4, 1995

[51] Int. Cl.$^6$ .................................. H04B 7/185
[52] U.S. Cl. .................. 342/353; 342/354; 342/368; 342/374; 455/13.3; 333/995
[58] Field of Search .................... 342/353, 354, 342/374, 368; 455/13.3; 333/995

[56] References Cited

U.S. PATENT DOCUMENTS 4,232,266  11/1980  Acampora .

Primary Examiner—Theodore M. Blum

[57] ABSTRACT

A design of equally loaded, under varying traffic load conditions, power amplifiers for a multibeam satellite is presented. Each output beam contains signals of only one beam corresponding to its input beam. The output beams are shaped to produce a small reduction of power at the crossover point of adjacent beams. MMIC and high Tc superconducting designs, including the design of high Tc superconducting reflector antenna, are presented.

8 Claims, 18 Drawing Sheets

IN PDPS LINE

TO PA1 TO IN1
TO PA2 TO IN2
TO PA3 TO IN3
TO PA4 TO IN4
TO PA5 TO IN5
TO PA6 TO IN6
TO PA7 TO IN7
TO PA8 TO IN8
TO PA9 TO IN9
TO PA10 TO IN10
TO PA11 TO IN11
TO PA12 TO IN12
TO PA13 TO IN13
TO PA14 TO IN14
TO PA15 TO IN15
TO PA16 TO IN16

PCPA SWPS LINE

TO B1 TO PA1
TO B2 TO PA2
TO B3 TO PA3
TO B4 TO PA4
TO B5 TO PA5
TO B6 TO PA6
TO B7 TO PA7
TO B8 TO PA8
TO B9 TO PA9
TO B10 TO PA10
TO B11 TO PA11
TO B12 TO PA12
TO B13 TO PA13
TO B14 TO PA14
TO B15 TO PA15
TO B16 TO PA16

F OUT R

HIGH EFFICIENCY SATELLITE MULTIBEAM EQUALLY LOADED TRANSMITTERS

FIELD OF INVENTION

1. The present invention relates to satellite multibeam transmitters.

2. In satellite communications, it is sometimes necessary to transmit using multiple beams.

DESCRIPTION OF PRIOR ART

Das discussed satellite multibeam antennas. S. Das, "Multibeam Antennas Improve Satellite Cummunications", pp. 42–55, MSN, December 1977. "An Adaptive Multiple Beam System Concept", IEEE Journal of Selected Areas in Communications, vol. SAC-4, No. 5, p. 630, 1987 has been discussed. A U.S. Pat. No. 4,907,004 has been issued.

SUMMARY OF THE INVENTION

The purpose of the present invention is to keep the different transmitters of a satellite equally loaded during dynamic traffic conditions and thus to minimise the prime power requirements of the satellite.

This kind of multiple beam transmitters can be used in INTELSAT, INMARSAT, domestic satellites, broadcasting satellites mobile satellites, personal communications satellites and other satellites where traffic load varies dynamically. For communication in many European countries, a small number of beams are required. For countries like China, Canada, some countries of South America and U.S.A., a moderate number of beams are required. For coverage of ocean areas by INMARSAT a larger number of beams are required.

Each input beam is fed to a power divider the number of outputs of which is equal to the number of power amplifiers. Each power amplifier input is connected to a power combiner the number of inputs of which is equal to the number of input beams. Equal amount of input signal from each input beam is fed to each power amplifier, loading each power amplifier equally under dynamic traffic loading conditions. Each power amplifier output is fed to a switch the number of outputs of which is equal to the number of output beams. Output of a power amplifier is fed to an element of a beam. Appropriate sets of phase shifters are used both after each power divider placed after each input beam and each switch placed after each amplifier so that the different portions of signal from one input beam are in phase only at the corresponding elements of one output beam and thus they add together. The different portions of signal from the same input beam are out of phase at the feed elements of another beam and thus they cancel one another. Each output beam carries signal of one input beam only. The number of feed elements in a cluster of any output beam is more than one and can be as many as the number of beams. A suitable number of feed elements permit shaping of the beam and to have an efficient crossover between adjacent output beams, with a small reduction power at the crossover point increasing the overall efficiency of the satellite communication system.

Another objective of this invention is to implement a portion or the entire system in a monolithic microwave integrated circuit (MMIC) technology. Another objective of this invention is to use a conductive deposition of a film of single crystal high Tc superconductor, such as YBCO, TBCCO, for a portion or the entire system and operate the system at a high superconducting temperature, currently between 75 and 105 degrees Kelvin, and thus reduce the conductive losses of the system. U.S. Pat. No. 5,409,889 includes a MMIC high Tc superconducting microwave device.

Another objecvtive is to build very low conductive loss high Tc superconductive waveguide multibeam transmitters. All the components, in the waveguide embodiment, are made of a single crystal high Tc superconductor such as YBCO, TBCCO. The waveguide feed elements and the reflector antenna are also made of a single crystal high Tc superconductor including YBCO, TBCCO. In another waveguide embodiment, all the components, including waveguide feed elements are made of a single crystal dielectric material, such as sapphire, lanthanum aluminate, having interior surfaces which are deposited with a film of a single crystal high Tc superconductor such as YBCO, TBCCO. The reflector antenna is also made of a single crystal dielectric material such as sapphire, lanthanum aluminate, having reflecting surfaces which are deposited with a film of a single crystal high Tc superconductor. The high Tc superconducting transmitters are operated at a high superconducting temperature currently above 77 degrees K. A Q of one million, for high Tc superconducting microwave devices, has been demonstrated. G. Shen, C. Wilker, P. Pang and W. C. Holstein, "High Tc Superconducting-sapphire Microwave resonator with Extremely High Q-Values up To 90 K," IEEE MTT-S, Digest, pp. 193–196, 1992. U.S. Pat. Nos. 5,407,904 and 5,407,905 have been issued on high Tc superconducting microwave devices.

Table I shows a comparison of the prior art and the present invention.

TABLE I

| BEAM | CHARACTERISTIC | PRIOR | THIS APPLICATION |
|---|---|---|---|
| 4 | ELEMENTS/BEAM (FIG.) | 1 | 4 |
|   | HYBRID | 8 |   |
|   | POWER DIVIDER |   | 8 |
|   | SWITCH |   | 4 |
|   | OUT BEAM CONNECTION | FIXED | FLEXIBLE |
| 16 | ELEMENTS/BEAM (FIG.) | 1 | 16 |
|   | HYBRID | 64 |   |
|   | POWER DIVIDER |   | 32 |
|   | SWITCH |   | 16 |
|   | OUT BEAM CONNECTION | FIXED | FLEXIBLE |

With these and other objectives in view, as will be more particularly pointed out in detail in the appended claims, reference is now made to the following description taken in connection with accompanying diagrams.

BRIEF DESCRIPTION OF THE DRAWINGS

FIG. 8 is a portion of a schematic diagram of a typical 16 beam embodiment of this invention including an input beam 7, a power amplifier 7 and an output beam 7.

DESCRIPTION OF THE PREFERRED EMBODIMENT

Figure 1:
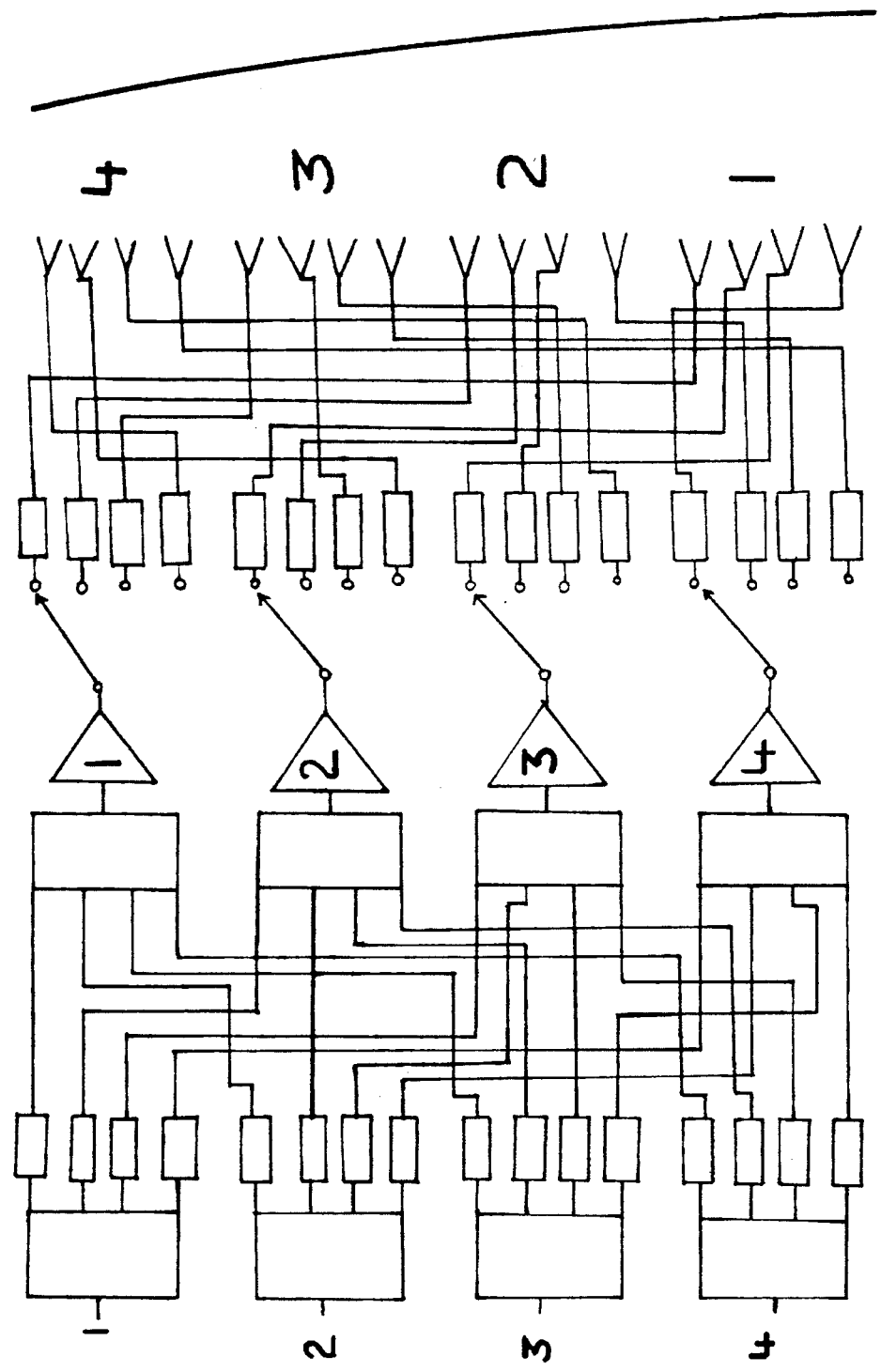
FIG. 1 is a schematic diagram of a typical 4 beam embodiment of this invention.

Referring now to the drawings, FIG. 1 depicts a 4-beam satellite transmitter system. Each input beam (IN) is connected to a 1 to 4 way, zero phase difference, power divider (PD) so that equal power from each beam is connected to each of the four power amplifiers (PA). A 4 to 1 way, zero phase difference, power combiner (PC) is connected to the input of each of the four power amplifiers so that an equal amount of signal from each input beam is connected to each power amplifier.

Each top or the 1st line of each input power divider, connected to each input beam 1 through 4, is connected, each through a separate phase shifter, to the power amplifier 1. Each next to the top or the 2nd line of each input power divider, connected to each input beam 1 through 4, is connected, each through a separate phase shifter, to the power amplifier 2. Each 3rd line of each input power divider, connected to each input beam 1 through 4, is connected, each through a separate phase shifter, to the power amplifier 3. Each 4th line of each input power divider, connected to each input beam 1 through 4, is connected, each through a separate phase shifter, to the power amplifier 4.

Each power amplifier is thus equally loaded under dynamically varying traffic load condtions. A single pole 4 throw, zero phase difference, switch (SW) is connected to the output of each power ampifier so that the output of each power amplifier is transmitted to the feed elements of each output beam. A first set of fixed phase shifters (PS) are connected at the output of each power divider which is placed after each input beam. A second set of fixed phase shifters (PS) are connected at the output of each switch which is placed after each power amplifier. The phase shifters, in some cases, can be extensions of equal length connecting lines by one, two or three quarter wavelengths at an operating frequency of the multibeam transmitters.

Typical values of phase shifts in the input and the corresponding output, for a 4 beam system, are shown in the following table II. These phase shifters are located, sequentially, from top to bottom. Namely, a phase shift of 0 degrees is provided on the top line of the power divider connected to the input beam 1. A phase shift of 90 degrees is connected to the second, from the top, line of the power divider connected to the input beam 1. The process is continued.

TABLE II

| | | 4 BEAM SYSTEM | |
|---|---|---|---|
| INPUT BEAM | INPUT PHASE | OUTPUT PHASE | OUTPUT BEAM |
| 1 | 0 | 0 | 4 |
| | 90 | 270 | |
| | 90 | 270 | |
| | 180 | 180 | |
| 2 | 90 | 270 | 3 |
| | 180 | 180 | |
| | 0 | 0 | |
| | 90 | 270 | |
| 3 | 90 | 270 | 2 |
| | 0 | 0 | |
| | 180 | 180 | |
| | 90 | 270 | |
| 4 | 180 | 180 | 1 |
| | 90 | 270 | |
| | 90 | 270 | |
| | 0 | 0 | |

Each top or the 1st line of each switch connected to each power amplifier 1 through 4, is connected, through a separate phase shifter, to the output beam 1. Each next to the top or the 2nd line of each switch, connected to each power amplifier 1 through 4, is connected, each through a separate phase shifter, to the output beam 2. Each 3rd line of each switch, connected to each power amplifier 1 through 4, is connected, each through a separate phase shifter, to the output beam 3. Each 4th line of each switch, each connected to each power amplifier 1 through 4, is connected, each through a separate phase shifter, to the output beam 4.

At each transmit beam, signal of only one input beam is in phase by appropriate selection of the set of phase shifters. For example, at the output beam position 1, only signals of the input beam amplified by each of the four amplifiers are in phase. The output signals corresponding to the input beam 2 are out of phase at beam position 1 (B1) from the different power ampifiers (PA) and as such, they cancel one another. The output signals corresponding to the input beam 3 are out of phase at the beam position 1 and as such, they cancel one another. The output signals, from different power amplifiers, corresponding to the input beam 4 are out of phase at the output beam position 1 and as such, they cancel one another. Similarly, the signal at the output beam position 2 is due to only the signal of the input beam 2. The signal at the output beam 3 is due to only the signal of the input beam 3. The signal at the output beam position 4 is due to only the signal of the input beam 4.

The four feed elements, at the output beam position 1, are placed close together at or near the focal plane of a reflector. A shaped beam is formed in space and is focussed in one specific geographic area. The four feed elements, located at the output beam position 2, are placed close together at or near the focal plane, separate from the location of the first four feed elements, of the previously mentioned reflector antenna. A second shaped beam is formed in space and is focussed in another geographical area adjacent but different from that area illuminated by output beam 1. There is a small reduction of power at the crossover point of the output beams 1 and 2. The four feed elements, located at the output beam position 3, are placed close together at or near the focal plane, separate from the location of the first eight feed elements associated with output beams 1 and 2, of the previously mentioned reflector antenna. A third shaped beam is formed in space and is focussed in another geographical area adjacent but different from that area illuminated by output beams 1 and 2. There is a small reduction of power at the crossover point of the output beams 2 and 3. The four feed elements, located at the output beam position 4, are placed close together at or near the focal plane, separate from the location of the first twelve feed elements associated with output beams 1, 2 and 3, of the previously mentioned reflector antenna (R). A fourth shaped beam is formed in space and is focussed in another geographical area adjacent but different from that area illuminated by output beams 1,2 and 3. There is a small reduction of power at the crossover point of the output beams 3 and 4.

Figure 2:
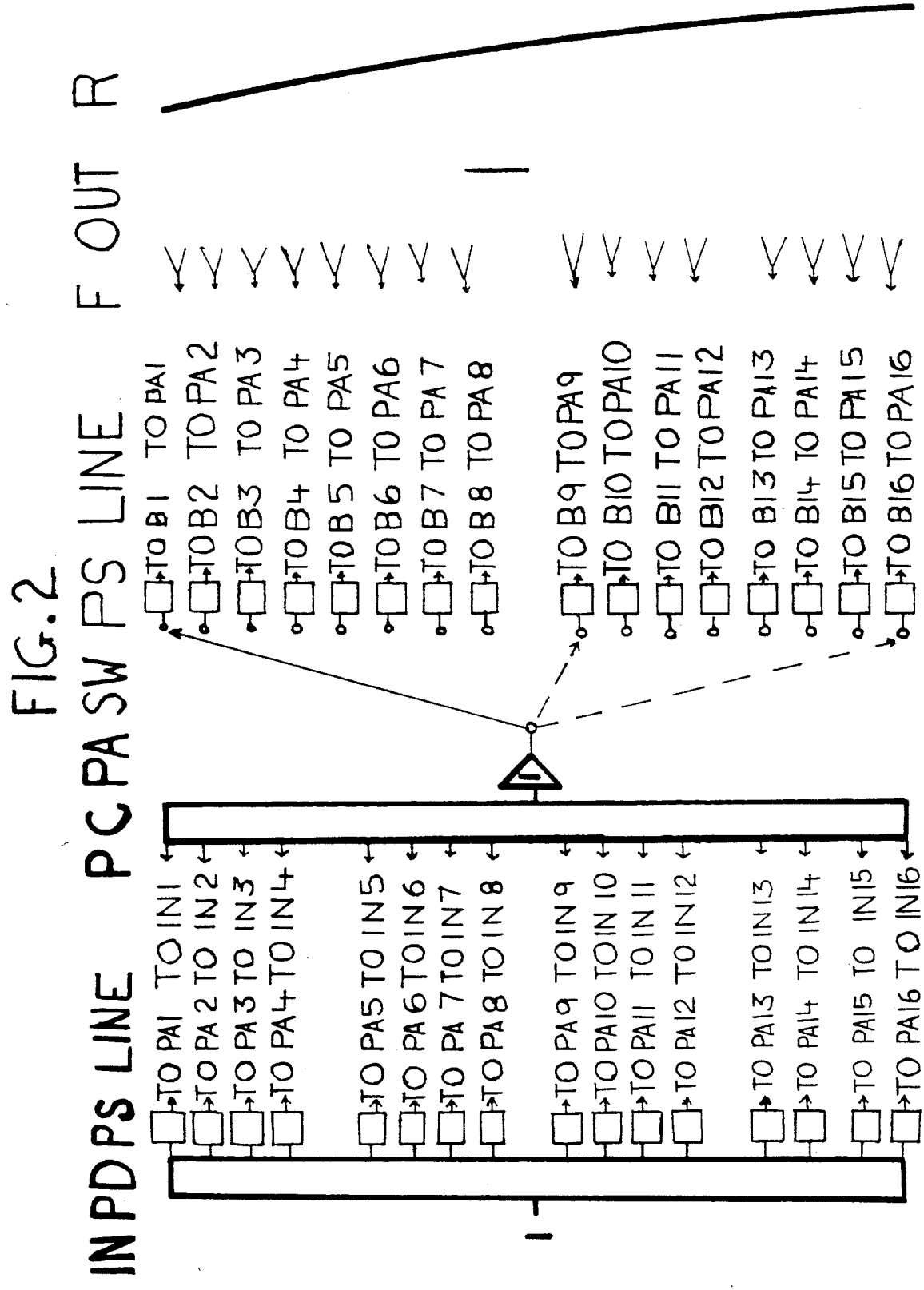
FIG. 2 is a portion of schematic diagram of a typical 16 beam embodiment of this invention including an input beam 1, a power amplifier 1 and an output beam 1.
Figure 17:
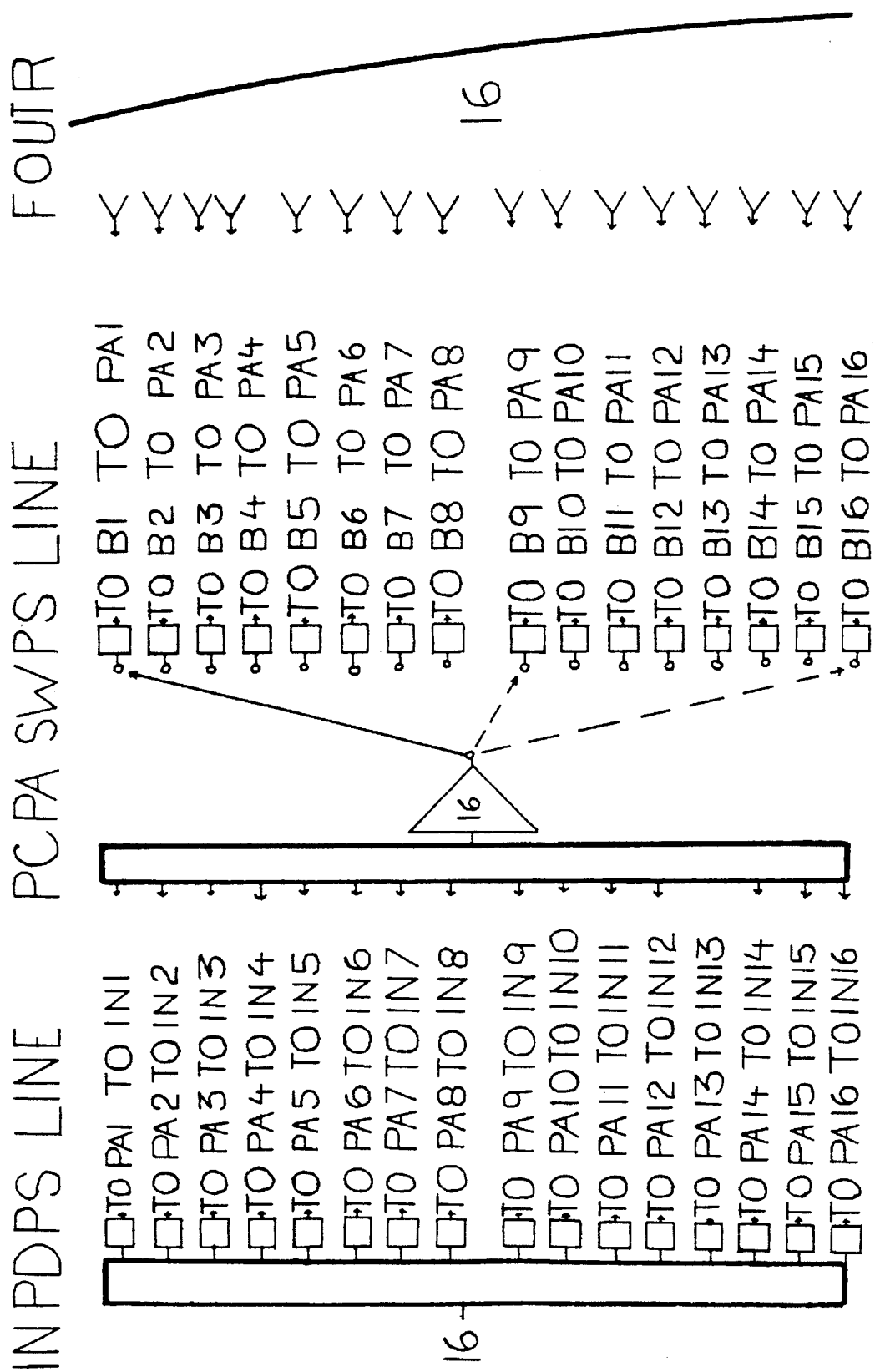
FIG. 17 is a portion of a schematic diagram of a typical 16 beam embodiment of this invention including an input beam 16, a power amplifier 16 and an output beam 16.

FIG. 2 throuh FIG. 17 depict a 16-beam embodiment of this invention. Each FIG. contains an input (IN), an input 1 to 16 way, zero phase shift, power divider (PD), input phase shifters (PS), a power amplifier (PA), a power amplifier 16 to 1 way, zero phase shift power combiner (PC), a single pole 16 throw switch (SW), output phase shifters (PS), feed (F) elements, an output (OUT) beam and a reflector antenna (R). Each, FIG. also contains connecting lines (LINE) both at the input of the power ampifier section and at the output of the power amplifier section. Each input beam signal is divided into 16 equal parts one for each of the 16 power ampifiers. Each line, at the output of the power divider is marked with an arrow. To PA means the line is going to a power amplifier (PA). A different number is associated with each line indicating the number of the power amplifier to which the line is connected. TO PA1 means that this line is connected to the power amplifier 1. TO PA 16 means that this line is connected to the power amplifier 16. TO IN means to the power divider of the input beam.

The input lines to the input beams are also marked with arrows. The number associated with TO IN refers to the input beam. TO IN1 means to the power divider of the input beam 1. TO IN 16 means to the power divider of the input beam 16. Each power amplifier receives 16 inputs, one from each input beam. One sixteenth of each input beam is fed to each power amplifier. Consequently, each power amplifier has equal traffic load under all dynmic load conditions. If, for example, the traffic in input beam 1 is increased, the loading of each power amplifier is increased by equal proportion. The loading of each power amplifier remains equal. The differences in the FIGS. 2 through 17 are related to the number of input beam, the number of the power amplifier and the number of the output beam as detailed in the following table III,

TABLE III

| FIG. | IN | PA | OUT |
| --- | --- | --- | --- |
| 2 | 1 | 1 | 1 |
| 3 | 2 | 2 | 2 |
| 4 | 3 | 3 | 3 |
| 5 | 4 | 4 | 4 |
| 6 | 5 | 5 | 5 |
| 7 | 6 | 6 | 6 |
| 8 | 7 | 7 | 7 |
| 9 | 8 | 8 | 8 |
| 10 | 9 | 9 | 9 |
| 11 | 10 | 10 | 10 |
| 12 | 11 | 11 | 11 |
| 13 | 12 | 12 | 12 |
| 14 | 13 | 13 | 13 |
| 15 | 14 | 14 | 14 |
| 16 | 15 | 15 | 15 |
| 17 | 16 | 16 | 16 |

Typical values of phase shifts in the input and the corresponding output, for a 4 beam system, are shown in the following table IV. These phase shifters are located, sequentially, from top to bottom. Namely, a phase shift of 0 degrees is provided on the top line of the power divider connected to the input beam 1. A phase shift of 90 degrees is connected to the second, from the top, line of the power divider connected to the input beam 1. The process is continued.

TABLE IV

| | 16 BEAM SYSTEM | | |
| --- | --- | --- | --- |
| IN BEAM | IN PHASE | OUT PHASE | OUT BEAM |
| 1 | 0 | 0 | 1 |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 180 | 180 |  |
|  | 270 | 90 |  |
|  | 270 | 90 |  |
|  | 0 | 0 |  |
|  | — | — |  |
| 2 | 90 | 270 | 2 |
|  | 180 | 180 |  |
|  | 180 | 180 |  |
|  | 270 | 90 |  |
|  | 180 | 180 |  |
|  | 270 | 90 |  |
|  | 270 | 90 |  |
|  | 0 | 0 |  |
|  | 0 | 0 |  |
|  | 90 | 270 |  |
|  | 90 | 270 |  |
|  | 180 | 180 |  |
|  | 90 | 270 |  |
|  | 180 | 180 |  |
|  | 180 | 180 |  |
|  | 270 | 90 |  |
|  | — | — |  |
| 3 | 90 | 270 | 3 |
|  | 180 | 180 |  |
|  | 180 | 180 |  |

TABLE IV-continued

16 BEAM SYSTEM

| IN BEAM | IN PHASE | OUT PHASE | OUT BEAM |
|---|---|---|---|
|  | 270 | 90 |  |
|  | 0 | 0 |  |
|  | 90 | 270 |  |
|  | 90 | 270 |  |
|  | 180 | 180 |  |
|  | 180 | 180 |  |
|  | 270 | 90 |  |
|  | 270 | 90 |  |
|  | 0 | 0 |  |
|  | 90 | 270 |  |
|  | 180 | 180 |  |
|  | 180 | 180 |  |
|  | 270 | 90 |  |
|  | — | — |  |
| 4 | 180 | 180 | 4 |
|  | 270 | 90 |  |
|  | 270 | 90 |  |
|  | 0 | 0 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 0 | 0 |  |
|  | 90 | 270 |  |
|  | 90 | 270 |  |
|  | 180 | 180 |  |
|  | — | — |  |
| 5 | 90 | 270 | 5 |
|  | 180 | 180 |  |
|  | 0 | 0 |  |
|  | 90 | 270 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 270 | 90 |  |
|  | 0 | 0 |  |
|  | 180 | 180 |  |
|  | 270 | 90 |  |
|  | — | — |  |
| 6 | 180 | 180 | 6 |
|  | 270 | 90 |  |
|  | 90 | 270 |  |
|  | 180 | 180 |  |
|  | 270 | 90 |  |
|  | 0 | 0 |  |
|  | 180 | 180 |  |
|  | 270 | 90 |  |
|  | 90 | 270 |  |
|  | 180 | 180 |  |
|  | 0 | 0 |  |
|  | 90 | 270 |  |
|  | 180 | 180 |  |
|  | 270 | 90 |  |
|  | 90 | 270 |  |
|  | 180 | 180 |  |
|  | — | — |  |
| 7 | 180 | 180 | 7 |
|  | 270 | 90 |  |
|  | 90 | 270 |  |
|  | 180 | 180 |  |
|  | 90 | 270 |  |
|  | 180 | 180 |  |
|  | 0 | 0 |  |
|  | 90 | 270 |  |
|  | 270 | 90 |  |
|  | 0 | 0 |  |
|  | 180 | 180 |  |
|  | 270 | 90 |  |
|  | 180 | 180 |  |
|  | 270 | 90 |  |
|  | 90 | 270 |  |
|  | 180 | 180 |  |
|  | — | — |  |
| 8 | 270 | 90 | 8 |
|  | 0 | 0 |  |
|  | 180 | 180 |  |
|  | 270 | 90 |  |
|  | 180 | 180 |  |
|  | 270 | 90 |  |
|  | 90 | 270 |  |
|  | 180 | 180 |  |
|  | 180 | 180 |  |
|  | 270 | 90 |  |
|  | 90 | 270 |  |
|  | 180 | 180 |  |
|  | 90 | 270 |  |
|  | 180 | 180 |  |
|  | 0 | 0 |  |
|  | 90 | 270 |  |
|  | — | — |  |
| 9 | 90 | 270 | 9 |
|  | 0 | 0 |  |
|  | 180 | 180 |  |
|  | 90 | 270 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 270 | 90 |  |
|  | 180 | 180 |  |
|  | 0 | 0 |  |
|  | 270 | 90 |  |
|  | — | — |  |
| 10 | 180 | 180 | 10 |
|  | 90 | 270 |  |
|  | 270 | 90 |  |
|  | 180 | 180 |  |
|  | 270 | 90 |  |
|  | 180 | 180 |  |
|  | 0 | 0 |  |
|  | 270 | 90 |  |
|  | 90 | 270 |  |
|  | 0 | 0 |  |
|  | 180 | 180 |  |
|  | 90 | 270 |  |
|  | 180 | 180 |  |
|  | 90 | 270 |  |
|  | 270 | 90 |  |
|  | 180 | 180 |  |
|  | — | — |  |
| 11 | 180 | 180 | 11 |
|  | 90 | 270 |  |
|  | 270 | 90 |  |
|  | 180 | 180 |  |
|  | 90 | 270 |  |
|  | 0 | 0 |  |
|  | 180 | 180 |  |
|  | 90 | 270 |  |
|  | 270 | 90 |  |
|  | 180 | 180 |  |
|  | 0 | 0 |  |
|  | 270 | 90 |  |
|  | 180 | 180 |  |
|  | 90 | 270 |  |
|  | 270 | 90 |  |
|  | 180 | 180 |  |
|  | — | — |  |

TABLE IV-continued

16 BEAM SYSTEM

| IN BEAM | IN PHASE | OUT PHASE | OUT BEAM |
|---|---|---|---|
| 12 | 270 | 90 | 12 |
|  | 180 | 180 |  |
|  | 0 | 0 |  |
|  | 270 | 90 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 90 | 270 |  |
|  | 0 | 0 |  |
|  | 180 | 180 |  |
|  | 90 | 270 |  |
| 13 | 180 | 180 | 13 |
|  | 90 | 270 |  |
|  | 90 | 270 |  |
|  | 0 | 0 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 0 | 0 |  |
|  | 270 | 90 |  |
|  | 270 | 90 |  |
|  | 180 | 180 |  |
| 14 | 270 | 90 | 14 |
|  | 180 | 180 |  |
|  | 180 | 180 |  |
|  | 90 | 270 |  |
|  | 0 | 0 |  |
|  | 270 | 90 |  |
|  | 270 | 90 |  |
|  | 180 | 180 |  |
|  | 180 | 180 |  |
|  | 90 | 270 |  |
|  | 90 | 270 |  |
|  | 0 | 0 |  |
|  | 270 | 90 |  |
|  | 180 | 180 |  |
|  | 180 | 180 |  |
|  | 90 | 270 |  |
| 15 | 270 | 90 | 15 |
|  | 180 | 180 |  |
|  | 180 | 180 |  |
|  | 90 | 270 |  |
|  | 180 | 180 |  |
|  | 90 | 270 |  |
|  | 90 | 270 |  |
|  | 0 | 0 |  |
|  | 0 | 0 |  |
|  | 270 | 90 |  |
|  | 270 | 90 |  |
|  | 180 | 180 |  |
|  | 270 | 90 |  |
|  | 180 | 180 |  |
|  | 180 | 180 |  |
|  | 90 | 270 |  |
| 16 | 0 | 0 | 16 |
|  | 270 | 90 |  |
|  | 270 | 90 |  |
|  | 180 | 180 |  |
|  | 270 | 90 |  |
|  | 180 | 180 |  |
|  | 180 | 180 |  |
|  | 90 | 270 |  |
|  | 270 | 90 |  |
|  | 180 | 180 |  |
|  | 180 | 180 |  |
|  | 90 | 270 |  |
|  | 180 | 180 |  |
|  | 90 | 270 |  |
|  | 90 | 270 |  |
|  | 0 | 0 |  |

The top or the first line of the power divider, connected to the input beam 1, is connected through a phase shifter, to the input of the power amplifier 1. The top or the first line of the power divider, connected to the input beam 2, is connected, through a phase shifter, to the input of the power amplier 1. Similarly, each of the top or the first line of the power dividers, connected to each input beam 3 through 16, is connected, each through a different phase shifter to the input power amplifier 1.

The line next to the top or the 2nd line of the power divider, connected to the input beam 1, is connected, through a phase shifter, to the input of the power amplifier 2. The line next to the top or the 2nd line of the power divider, connected to the input beam 2, is connected, through a phase shifter, to the input of the power amplifier 2. Similarly, each of the next to the top or the 2nd line of each power divider, connected to each input beam 3 through 16, is connected, each through a different phase shifter, to the input of the power amplifier 2.

The 3rd line from the top of the power divider, connected to the input beam 1 is connected, through a phase shifter, to the input of the power amplifier 3. The 3rd line from the top of the power divider, connected to the input beam 2, is connected, through a phase shifter to the input of the power amplifier 3. Similarly, each of the 3rd line from the top of each power divider, connected to each input beam 3 to 16, is connected, each through a different phase shifter, to the input of the power amplier 3.

The 4th line from the top of the power divider, connected to the input beam 1, is connected, through a phase shifter, to the input of the power amplifier 4. The 4th line from the top of the power divider, connected to the input beam 2, is connected, through a phase shifter, to the input of the power amplifier 4. Similarly, each 4th line from each power divider, connected each input beam 3 through 16, is connected, each through a different phase shifter to the input of the power amplifier 4.

The 5th line from the top of the power divider, connected to the input beam 1, is connected, through a phase shifter, to the input of the power amplifier 5. The 5th line from the top of the power divider, connected to the input beam 2, is connected, through a phase shifter, to the input of the power amplifier 5. Similarly, each 5th line from each power divider, connected each input beam 3 through 16, is connected, each through a different phase shifter to the input of the power amplifier 5.

The 6th line from the top of the power divider, connected to the input beam 1, is connected, through a phase shifter, to the input of the power amplifier 6. The 6th line from the top of the power divider, connected to the input beam 2, is connected, through a phase shifter, to the input of the power amplifier 6. Similarly, each 6th line from each power divider, connected each input beam 3 through 16, is connected, each through a different phase shifter to the input of the power amplifier 6.

The 7th line from the top of the power divider, connected to the input beam 1, is connected, through a phase shifter, to the input of the power amplifier 7. The 7th line from the top of the power divider, connected to the input beam 2, is connected, through a phase shifter, to the input of the power amplifier 7. Similarly, each 7th line from each power divider, connected each input beam 3 through 16, is connected, each through a different phase shifter to the input of the power amplifier 7.

The 8th line from the top of the power divider, connected to the input beam 1, is connected, through a phase shifter, to the input of the power amplifier 8. The 8th line from the top of the power divider, connected to the input beam 2, is connected, through a phase shifter, to the input of the power amplifier 8. Similarly, each 8th line from each power divider, connected each input beam 3 through 16, is connected, each through a different phase shifter to the input of the power amplifier 8.

The 9th line from the top of the power divider, connected to the input beam 1, is connected, through a phase shifter, to the input of the power amplifier 9. The 9th line from the top of the power divider, connected to the input beam 2, is connected, through a phase shifter, to the input of the power amplifier 9. Similarly, each 9 th line from each power divider, connected each input beam 3 through 16, is connected, each through a different phase shifter to the input of the power amplifier 9.

The 10th line from the top of the power divider, connected to the input beam 1, is connected, through a phase shifter, to the input of the power amplifier 10. The 10th line from the top of the power divider, connected to the input beam 2, is connected, through a phase shifter, to the input of the power amplifier 10. Similarly, each 10th line from each power divider, connected each input beam 3 through 16, is connected, each through a different phase shifter to the input of the power amplifier 10.

The 11th line from the top of the power divider, connected to the input beam 1, is connected, through a phase shifter, to the input of the power amplifier 11. The 11th line from the top of the power divider, connected to the input beam 2, is connected, through a phase shifter, to the input of the power amplifier 11. Similarly, each 11 th line from each power divider, connected each input beam 3 through 16, is connected, each through a different phase shifter to the input of the power amplifier 11.

The 12th line from the top of the power divider, connected to the input beam 1, is connected, through a phase shifter, to the input of the power amplifier 12. The 12th line from the top of the power divider, connected to the input beam 2, is connected, through a phase shifter, to the input of the power amplifier 12. Similarly, each 12th line from each power divider, connected each input beam 3 through 16, is connected, each through a different phase shifter to the input of the power amplifier 12.

The 13th line from the top of the power divider, connected to the input beam 1, is connected, through a phase shifter, to the input of the power amplifier 13. The 13th line from the top of the power divider, connected to the input beam 2, is connected, through a phase shifter, to the input of the power amplifier 13. Similarly, each 13th line from each power divider, connected each input beam 3 through 16, is connected, each through a different phase shifter to the input of the power amplifier 13.

The 14th line from the top of the power divider, connected to the input beam 1, is connected, through a phase shifter, to the input of the power amplifier 14. The 14th line from the top of the power divider, connected to the input beam 2, is connected, through a phase shifter, to the input of the power amplifier 14. Similarly, each 14th line from each power divider, connected each input beam 3 through 16, is connected, each through a different phase shifter to the input of the power amplifier 14.

The 15th line from the top of the power divider, connected to the input beam 1, is connected, through a phase shifter, to the input of the power amplifier 15. The 15th line from the top of the power divider, connected to the input beam 2, is connected, through a phase shifter, to the input of the power amplifier 15. Similarly, each 15th line from each power divider, connected each input beam 3 through 16, is connected, each through a different phase shifter to the input of the power amplifier 15.

The 16th line from the top of the power divider, connected to the input beam 1, is connected, through a phase shifter, to the input of the power amplifier 16. The 16th line from the top of the power divider, connected to the input beam 2, is connected, through a phase shifter, to the input of the power amplifier 16. Similarly, each 16th line from each power divider, connected each input beam 3 through 16, is connected, each through a different phase shifter to the input of the power amplifier 16.

The top or the 1st line from the output switch, connected to the output of the power amplifier 1, is connected, through a phase shifter, to the output beam 1. The top or the 1st line from the switch, connected to the output of the power amplifier 2, is connected, through a phase shifter, to the output beam 1. Similarly, the top or the 1st line of each switch, connected to each output of the power amplifier 3 through to 16, is connected, each through a different phase shifter, to the output beam 1.

The next to the top or the 2nd line from the output switch, connected to the output of the power amplifier 1, is connected, through a phase shifter, to the output beam 2. The next to the top or the 2nd line of the output switch, connected to the output of the power amplifier 2, is connected, through a phase shifter, to the output beam 2. Similarly, the next to the top or the 2nd line of each switch, connected to the output of each power amplifier 3 though to 16, is connected, each through different phase shifter, to the output beam 2.

The 3rd line from the top of the output switch, connected to the output of the power amplifier 1, is connected, through a phase shifter, to the output beam 3. The 3rd line from the top of the output switch, connected to the output of the power amplifier 2, is connected, through a phase shifter, to the output beam 3. Similarly, each 3rd line from the top of each switch, connected to the output of each power amplifier 3 though to 16, is connected, each through a different phase shifter, to the output beam 3.

The 4th line from the top of the output switch, connected to the output of the power amplifier 1, is connected, through a phase shifter, to the output beam 4. The 4th line from the top of the output switch, connected to the output of the power amplifier 2, is connected, through a phase shifter, to the output beam 4. Similarly, each 4th line from the top of each switch, connected to the output of each power amplifier 3 though to 16, is connected, each through a different phase shifter, to the output beam 4.

The 5th line from the top of the output switch, connected to the output of the power amplifier 1, is connected, through a phase shifter, to the output beam 5. the 5th line from the top of the output switch, connected to the output of the power amplifier 2, is connected, through a phase shifter, to the output beam 5. Similarly, each 5th line from the top of each switch, connected to the output of each power amplifier 3 though to 16, is connected, each through a different phase shifter, to the output beam 5.

The 6th line from the top of the output switch, connected to the output of the power amplifier 1, is connected, through a phase shifter, to the output beam 6. The 6th line from the top of the output switch, connected to the output of the power amplifier 2, is connected, through a phase shifter, to the output beam 6. Similarly, each 6th line from the top of each switch, connected to the output of each power amplifier 3 though to 16, is connected, each through a different phase shifter, to the output beam 6.

The 7th line from the top of the output switch, connected to the output of the power amplifier 1, is connected, through a phase shifter, to the output beam 7. The 7th line from the top of the output switch, connected to the output of the power amplifier 2, is connected, through a phase shifter, to the output beam 7. Similarly, each 7th line from the top of each switch, connected to the output of each power amplifier 3 though to 16, is connected, each through a different phase shifter, to the output beam 7.

The 8th line from the top of the output switch, connected to the output of the power amplifier 1, is connected, through a phase shifter, to the output beam 8. The 8th line from the top of the output switch, connected to the output of the power amplifier 2, is connected, through a phase shifter, to the output beam 8. Similarly, each 8th line from the top of each switch, connected to the output of each power amplifier 3 though to 16, is connected, each through a different phase shifter, to the output beam 8.

The 9th line from the top of the output switch, connected to the output of the power amplifier 1, is connected, through a phase shifter, to the output beam 9. The 9th line from the top of the output switch, connected to the output of the power amplifier 2, is connected, through a phase shifter, to the output beam 9. Similarly, each 9th line from the top of each switch, connected to the output of each power amplifier 3 though to 16, is connected, each through a different phase shifter, to the output beam 9.

The 10th line from the top of the output switch, connected to the output of the power amplifier 1, is connected, through a phase shifter, to the output beam 10. The 10th line from the top of the output switch, connected to the output of the power amplifier 2, is connected, through a phase shifter, to the output beam 10. Similarly, each 10th line from the top of each switch, connected to the output of each power amplifier 3 though to 16, is connected, each through a different phase shifter, to the output beam 10.

The 11th line from the top of the output switch, connected to the output of the power amplifier 1, is connected, through a phase shifter, to the output beam 11. The 11th line from the top of the output switch, connected to the output of the power amplifier 2, is connected, through a phase shifter, to the output beam 11. Similarly, each 11th line from the top of each switch, connected to the output of each power amplifier 3 though to 16, is connected, each through a different phase shifter, to the output beam 11.

The 12th line from the top of the output switch, connected to the output of the power amplifier 1, is connected, through a phase shifter, to the output beam 12. The 12th line from the top of the output switch, connected to the output of the power amplifier 2, is connected, through a phase shifter, to the output beam 12. Similarly, each 12th line from the top of each switch, connected to the output of each power amplifier 3 though to 16, is connected, each through a different phase shifter, to the output beam 12.

The 13th line from the top of the output switch, connected to the output of the power amplifier 1, is connected, through a phase shifter, to the output beam 13. The 13th line from the top of the output switch, connected to the output of the power amplifier 2, is connected, through a phase shifter, to the output beam 13. Similarly, each 13th line from the top of each switch, connected to the output of each power amplifier 3 though to 16, is connected, each through a different phase shifter, to the output beam 13.

The 14th line from the top of the output switch, connected to the output of the power amplifier 1, is connected, through a phase shifter, to the output beam 14. The 14th line from the top of the output switch, connected to the output of the power amplifier 2, is connected, through a phase shifter, to the output beam 14. Similarly, each 14th line from the top of each switch, connected to the output of each power amplifier 3 though to 16, is connected, each through a different phase shifter, to the output beam 14.

The 15th line from the top of the output switch, connected to the output of the power amplifier 1, is connected, through a phase shifter, to the output beam 15. The 15th line from the top of the output switch, connected to the output of the power amplifier 2, is connected, through a phase shifter, to the output beam 15. Similarly, each 15th line from the top of each switch, connected to the output of each power amplifier 3 though to 16, is connected, each through a different phase shifter, to the output beam 15.

The 16th line from the top of the output switch, connected to the output of the power amplifier 1, is connected, through a phase shifter, to the output beam 16. the 16th line from the top of the output switch, connected to the output of the power amplifier 2, is connected, through a phase shifter, to the output beam 16. Similarly, each 16th line from the top of each switch, connected to the output of each power amplifier 3 though to 16, is connected, each through a different phase shifter, to the output beam 16.

Each output power amplifier is switched, from the output beam 1 to the output beam 2, at the Nyquist rate. If a cycle of switching is completed in 100 nS, then a signal bandwidth of 20 MHz or a 20 Mbps digital signal can be transmitted through the multibeam transmitters. For transmitting a 100 MHz signal, a cycle of switching is to be completed in 20 nS.

All the switches are synchronized. At a particular time, all the amplifiers are connected to provide output only at the output beam 1. At another time, all the amplifiers are connected to provide output only at the output beam 2. The switches are synchronized to provide output to only one beam at a time. Finally, all the, amplifiers provide output only to the last output beam. The cycle is then repeated.

With this design, a dwell time of a real time required for any particular or a number of output beams can be provided. This design provides time delay multiple access (TDMA) capability.

The signals arriving at the feed elements for the output beam 1, corresponding to the input beam 1, arrive in phase and add together in space. The signals arriving at the feed elements for the output beam 1, corresponding to the input beam 2, arrive in antiphase and they cancel one another in space. The signals arriving at the feed elements for the output beam 1, corresponding to the input beam 3, arrive in antiphase and they cancel one another in space. Similarly, signals arriving at the feed elements for the output beam 1, corresponding to each input beam 4 through 16, arrive in antiphase and they cancel one another in space. The feed elements of the output beam 1 carry signal of only input beam 1 and signals of each input beam 2 through 16 are cancelled in space. Each output beam carries signal of its corresponding input beam only.

There is a flexibility in positioning the output beams in relation to the corresponding input beams. For example, the output line from each 1st line of the output power divider, each connected to each power amplifier 1 through 16, is connected, each through a different phase shifter, to the output beam 1. All these signals, from power amplifier 1 through 16, after each phase shifter, travel through equal length of lines arriving at the output beam 1. These equal length lines can terminate opposite input beam 16 or they can end opposite to input beam position 1, as shown in FIG. 2, or anywhere in between them. There is a complete flexibility in positioning the output beam in relation to its input beam.

Figure 3:
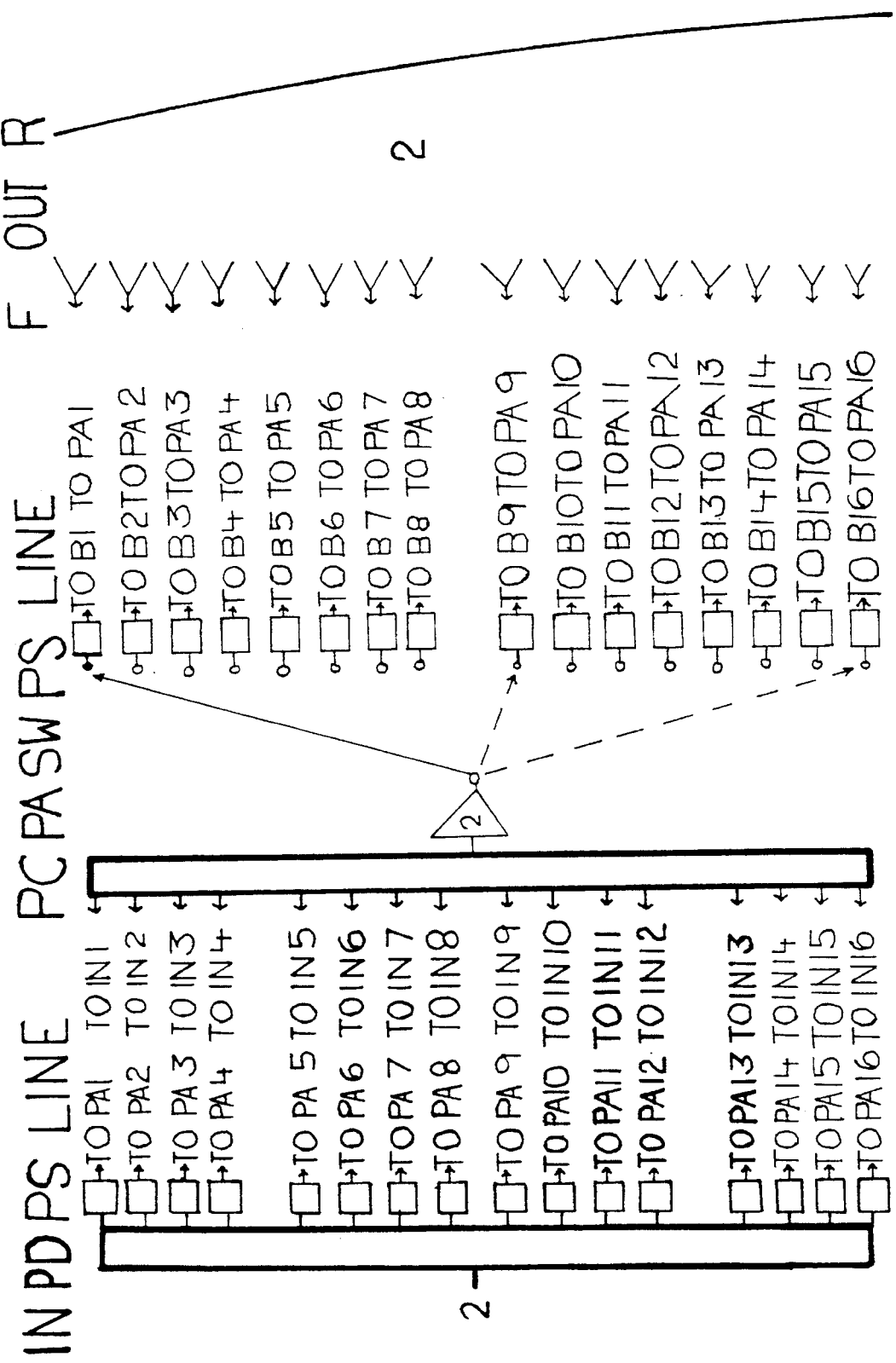
FIG. 3 is another portion of a schematic diagram of a typical 16 beam embodiment of this invention including an input beam 2, a power amplifier 2 and an output beam 2.
Figure 4:
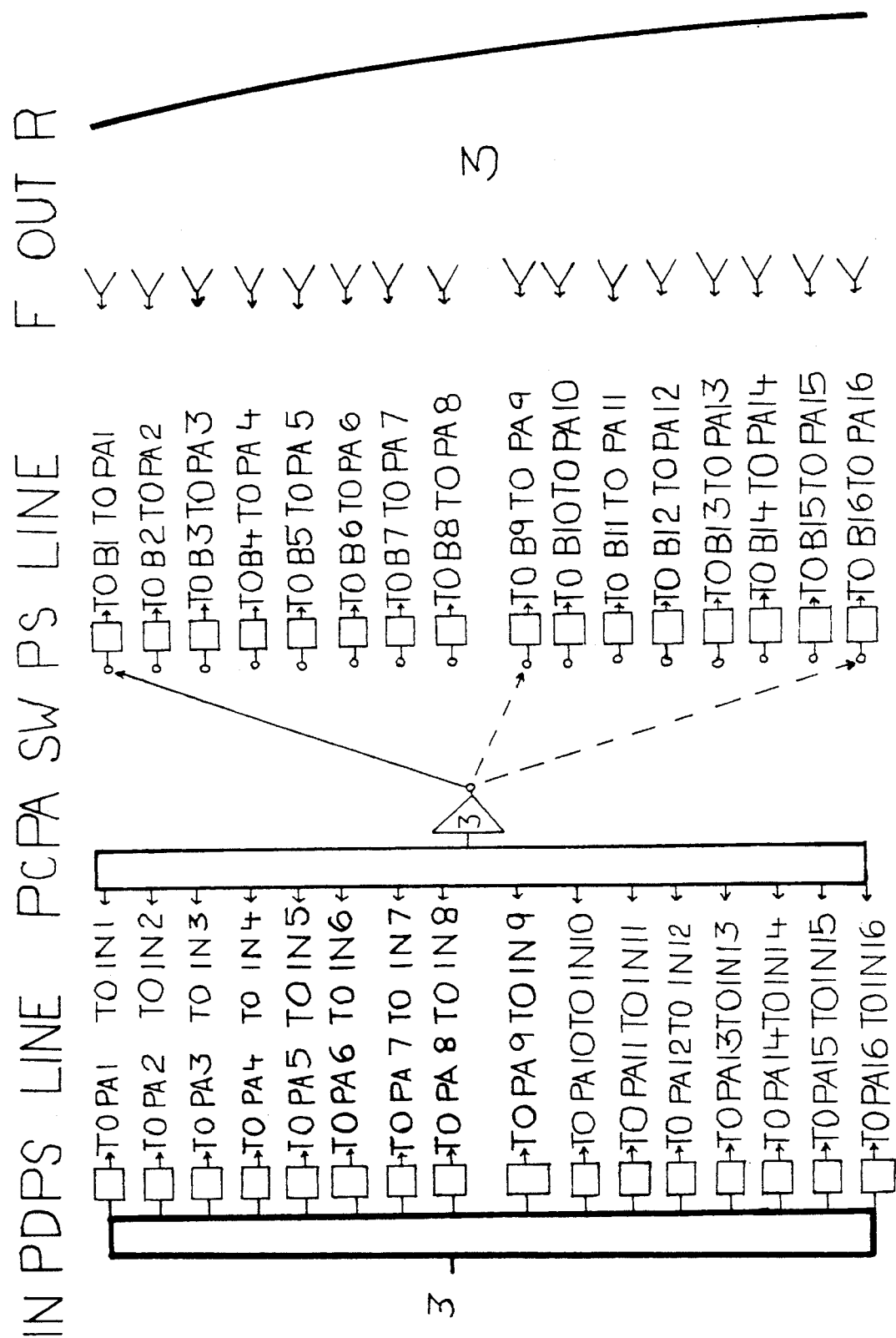
FIG. 4 is a portion of a schematic diagram of a typical 16 beam embodiment of this invention including an input beam 3, a power amplifier 3 and an output beam 3.
Figure 5:
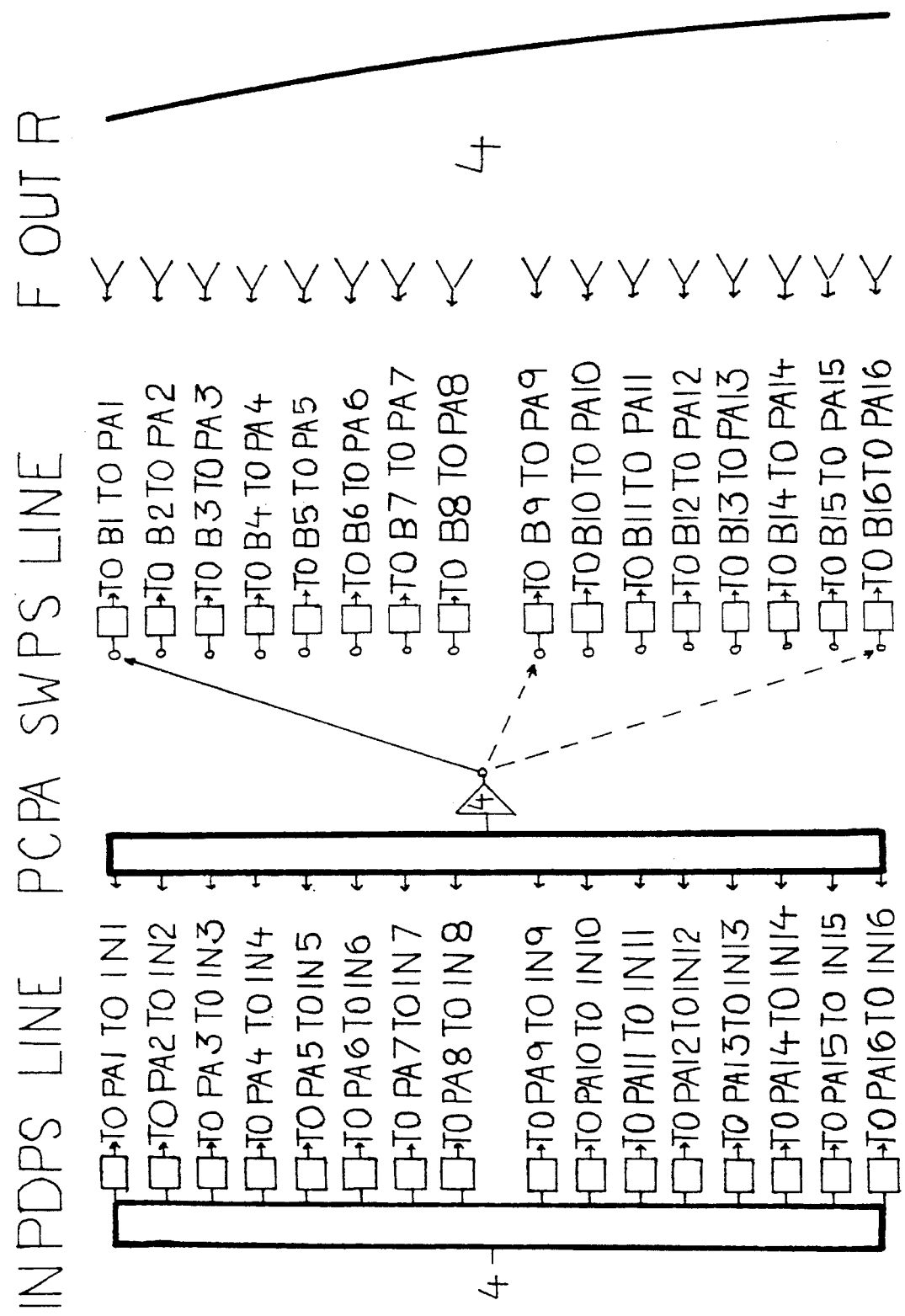
FIG. 5 is a portion of a schematic diagram of a typical 16 beam embodiment of this invention including an input beam 4, a power amplifier 4 and an output beam 4.
Figure 6:
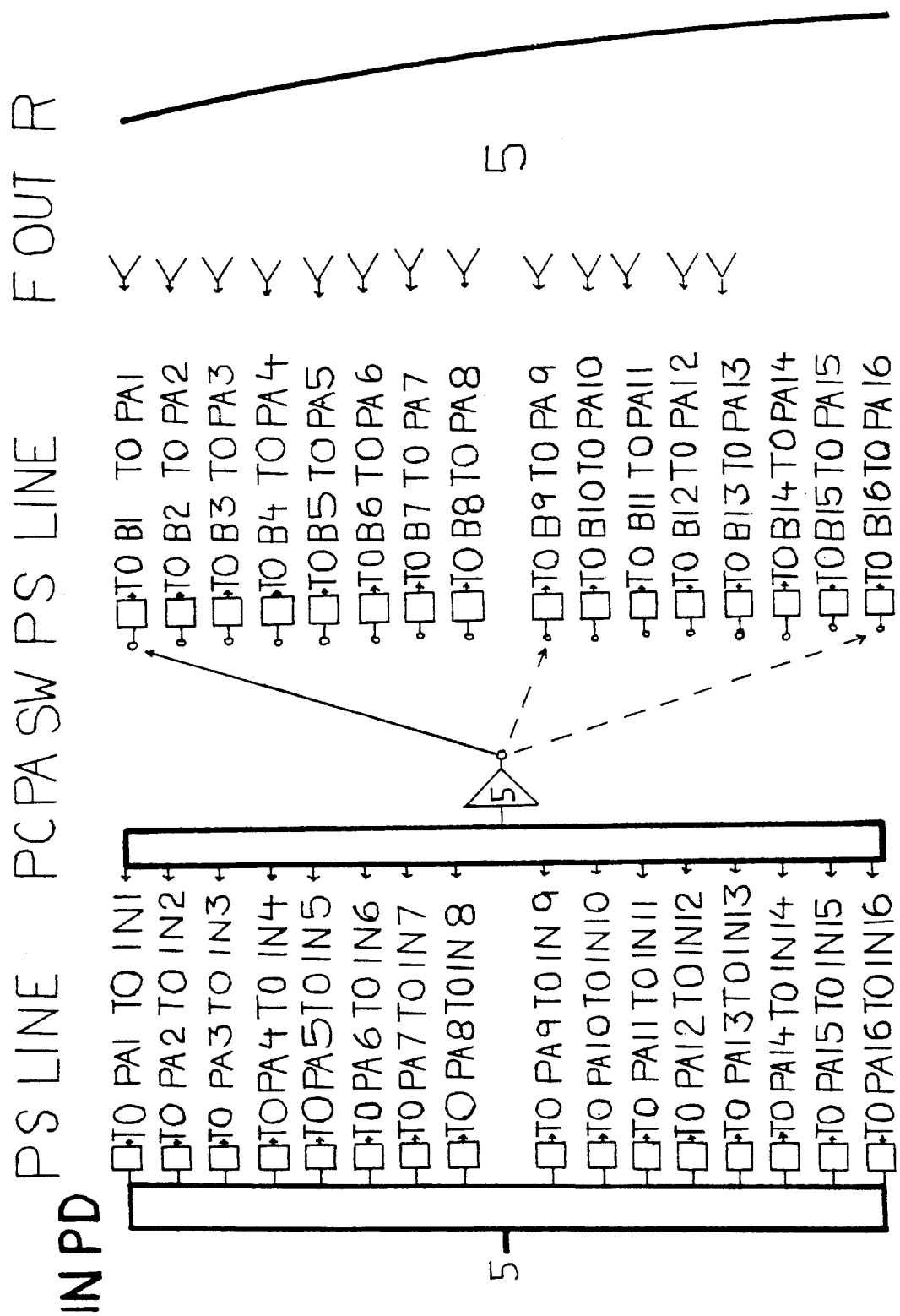
FIG. 6 is a portion of a schematic diagram of a typical 16 beam embodiment of this invention including an input beam 5, a power amplifier 5 and an output beam 5.
Figure 7:
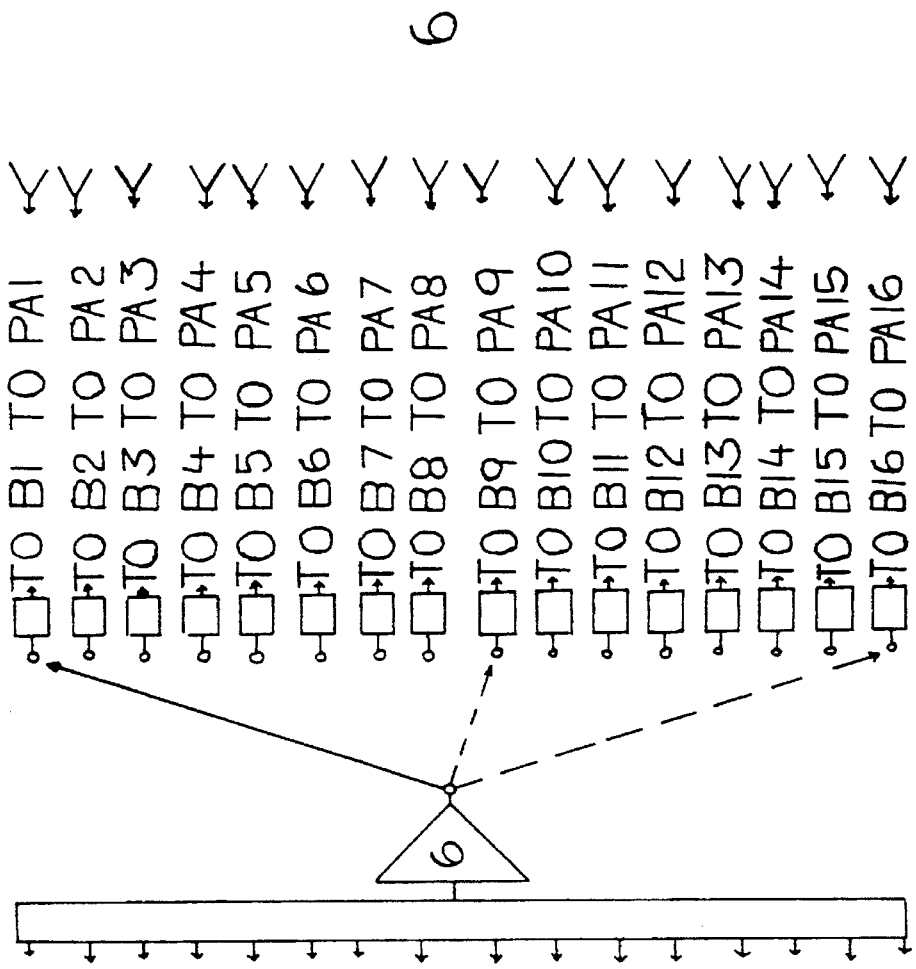
FIG. 7 is a portion of a schematic diagram of a typical 16 beam embodiment of this invention including an input beam 6, a power amplifier 6 and an output beam 6.
Figure 9:
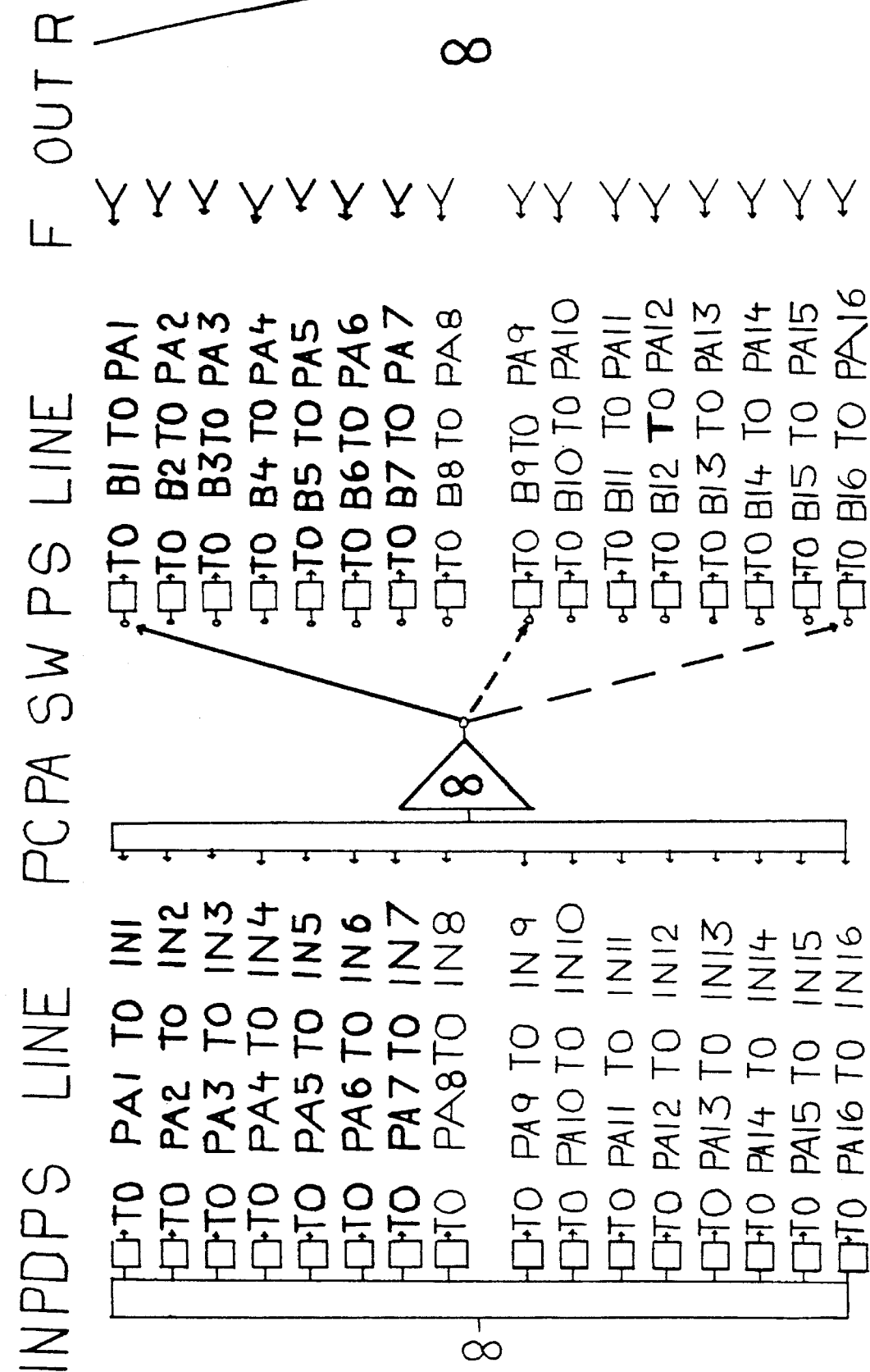
FIG. 9 is a portion of a schematic diagram of a typical 16 beam embodiment of this invention including an input beam 8, a power amplifier 8 and an output beam 8.
Figure 10:
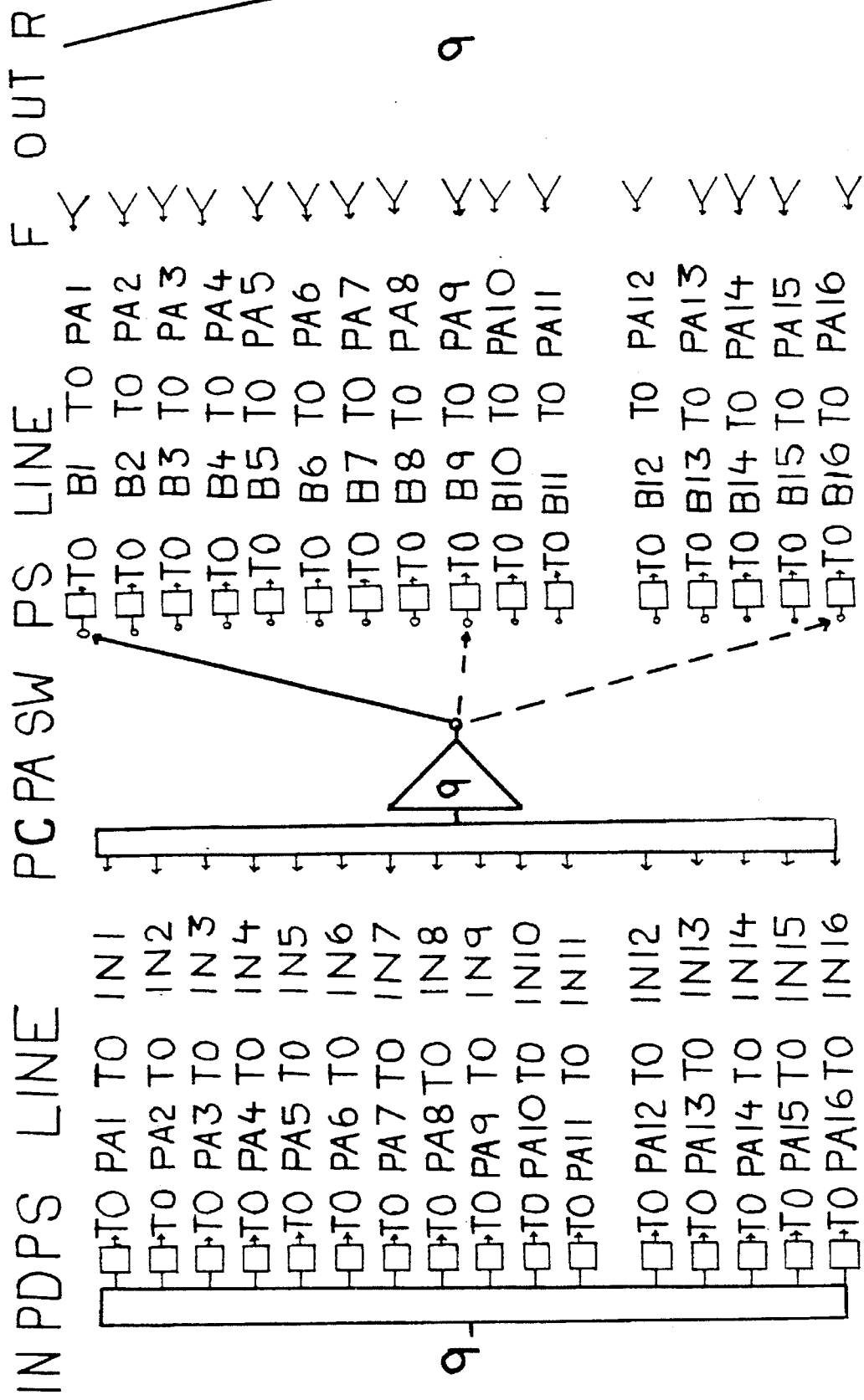
FIG. 10 is a portion of a schematic diagram of a typical 16 beam embodiment of this invention including an input beam 9, a power amplifier 9 and an output beam 9.
Figure 11:
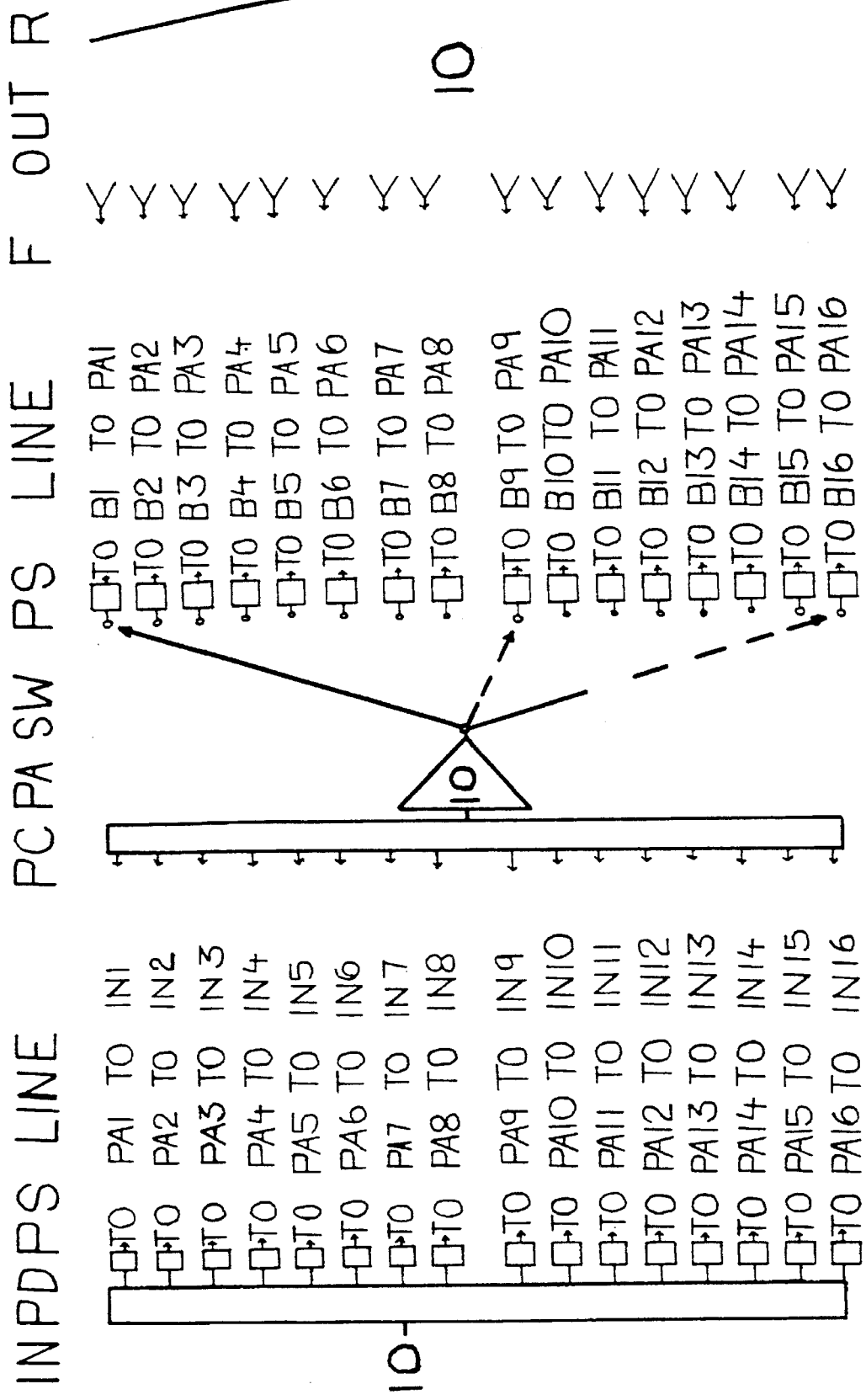
FIG. 11 is a portion of a schematic diagram of a typical 16 beam embodiment of this invention including an input beam 10, a power amplifier 10 and an output beam 10.
Figure 12:
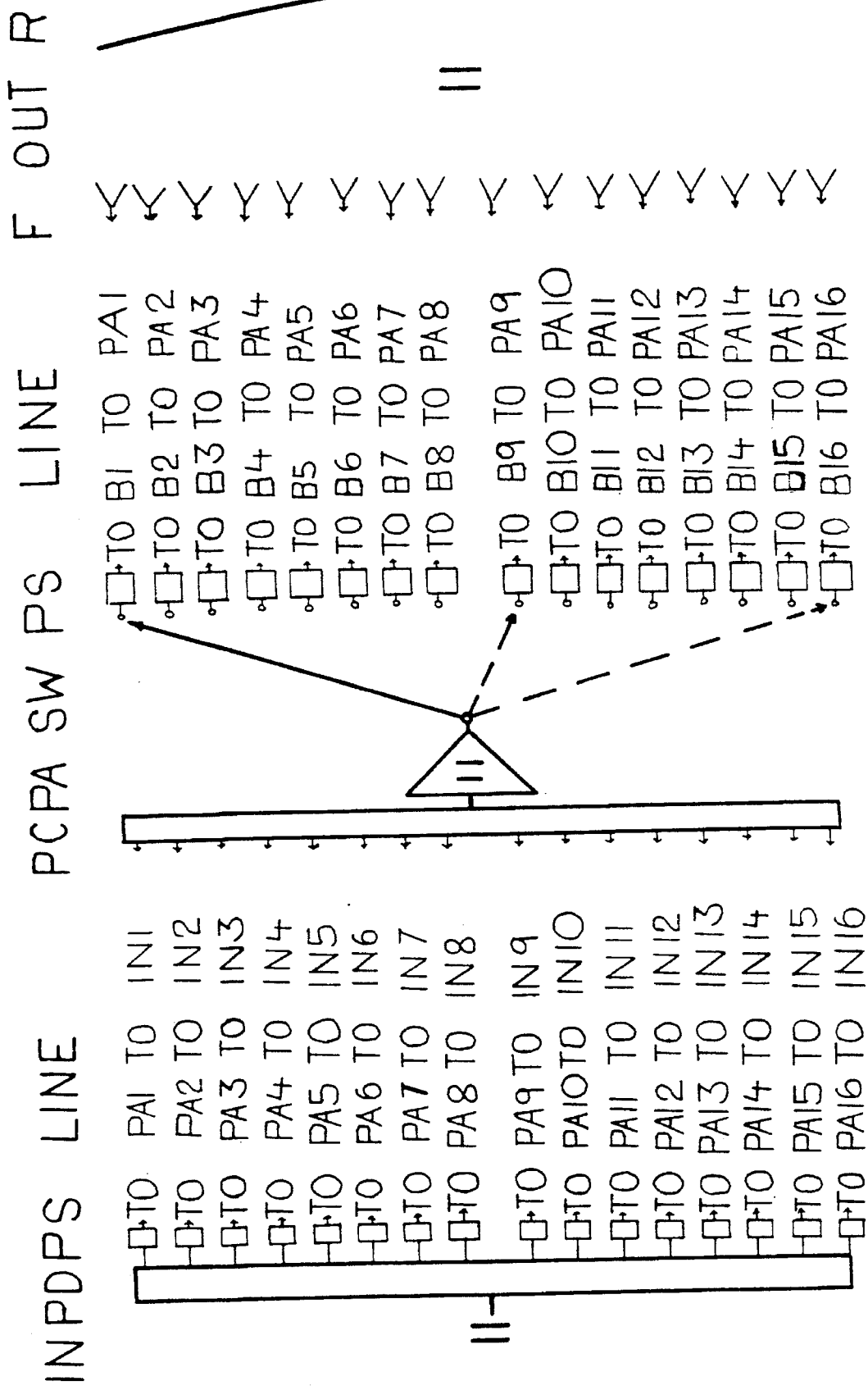
FIG. 12 is a portion of a schematic diagram of a typical 16 beam embodiment of this invention including an input beam 11, a power amplifier 11 and an output beam 11.
Figure 13:
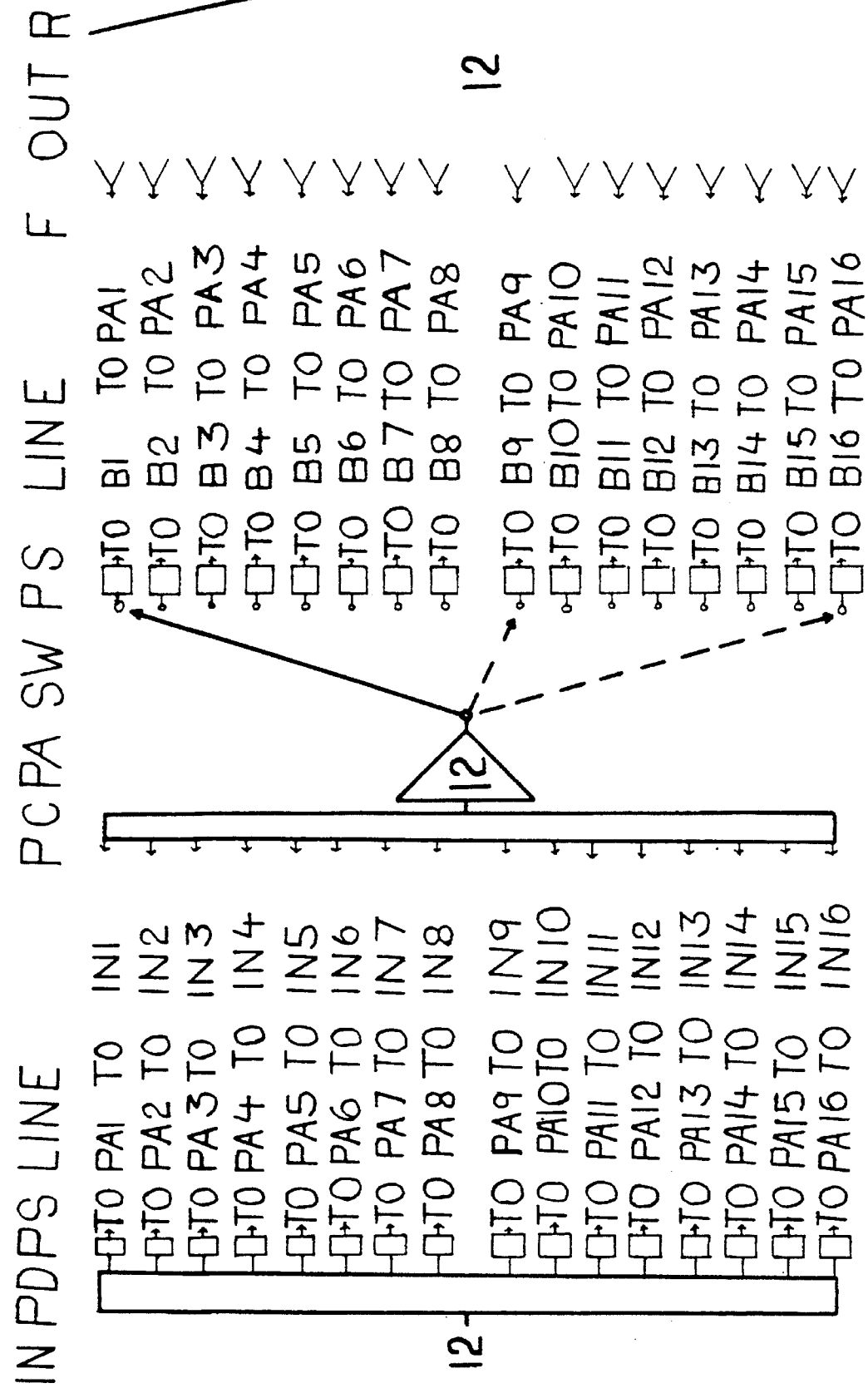
FIG. 13 is a portion of a schematic diagram of a typical 16 beam embodiment of this invention including an input beam 12, a power amplifier 12 and an output beam 12.
Figure 14:
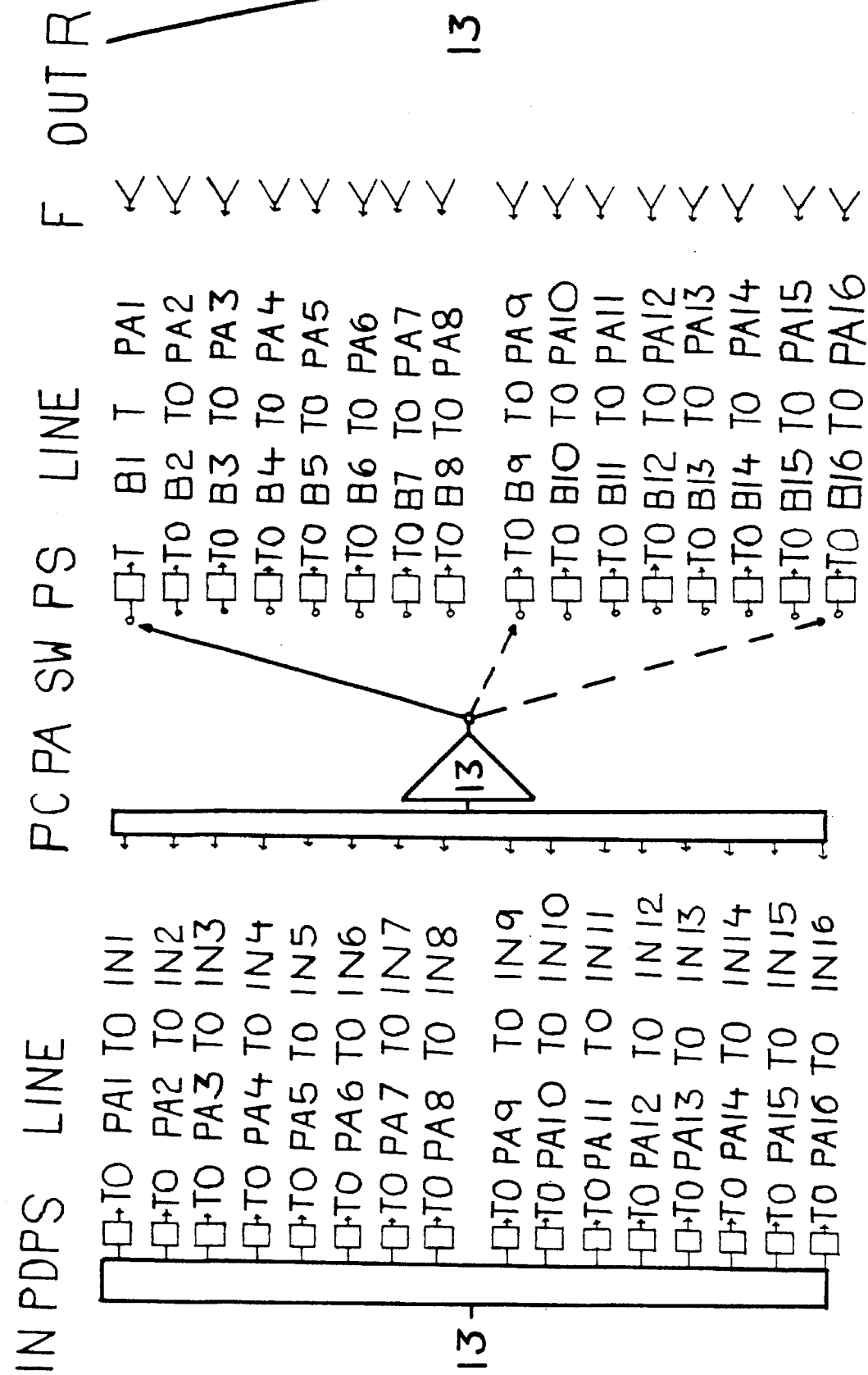
FIG. 14 is a portion of a schematic diagram of a typical 16 beam embodiment of this invention including an input beam 13, a power amplifier 13 and an output beam 13.
Figure 15:
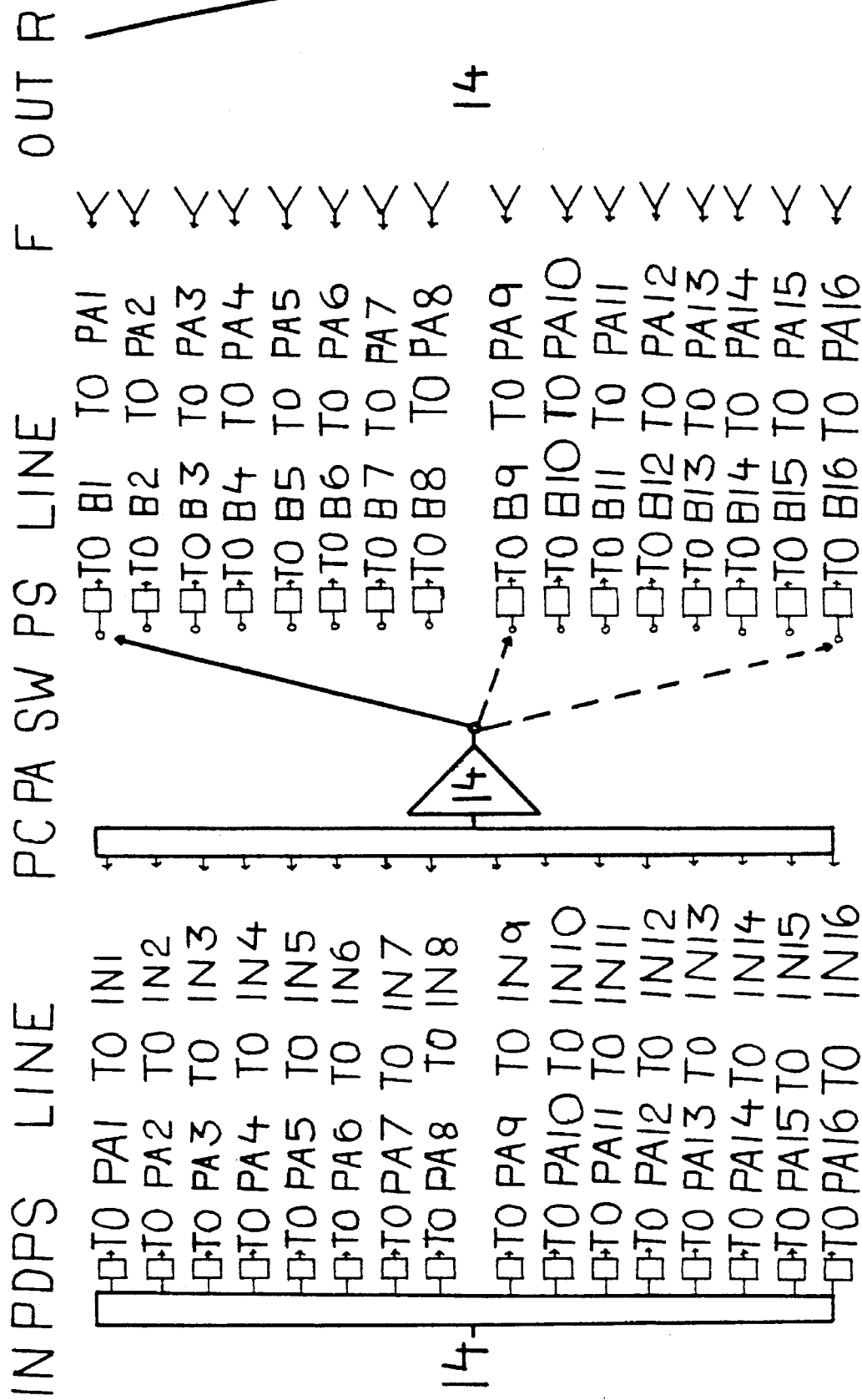
FIG. 15 is a portion of a schematic diagram of a typical 16 beam embodiment of this invention including an input beam 14, a power amplifier 14 and an output beam 14.
Figure 16:
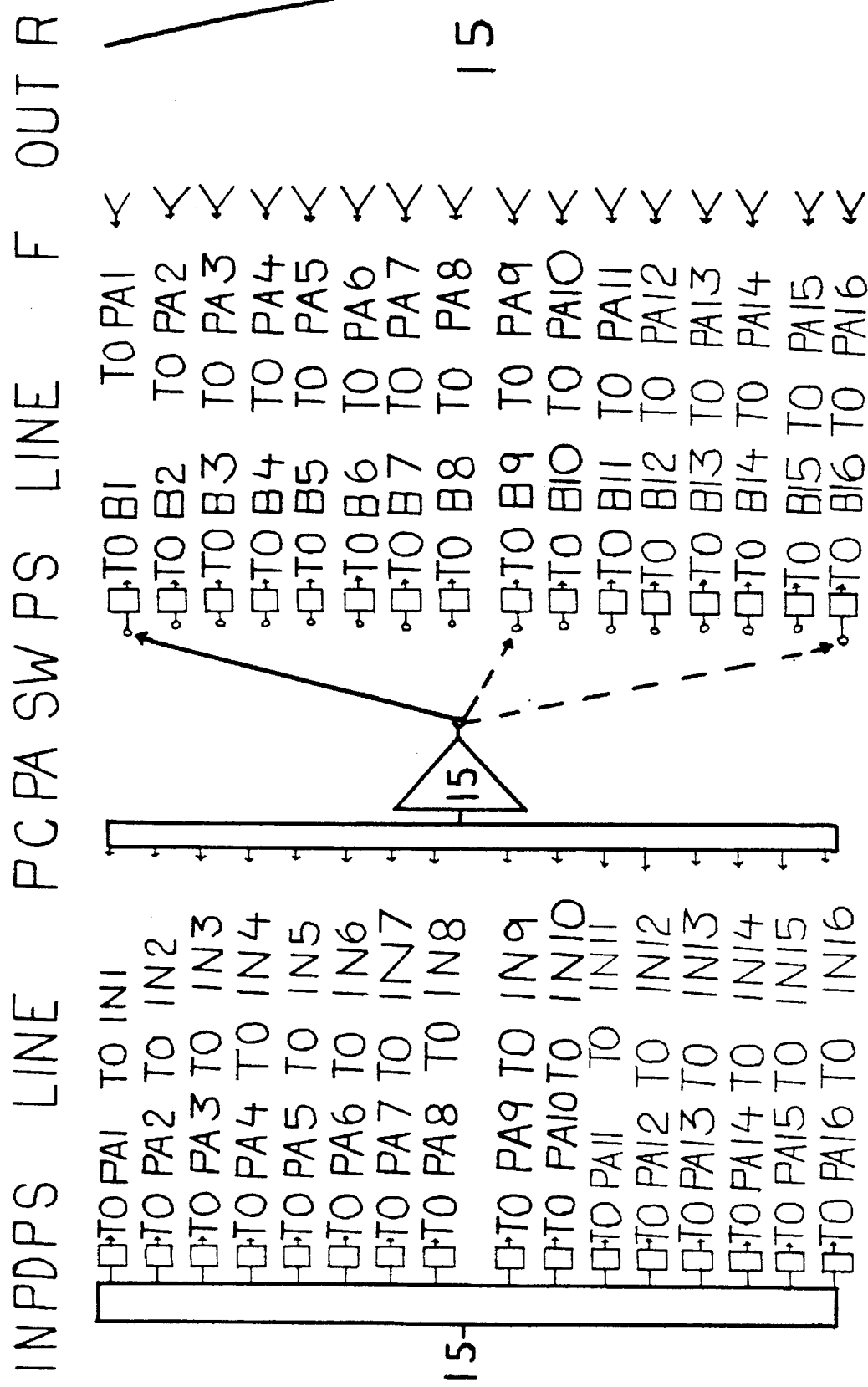
FIG. 16 is a portion of a schematic diagram of a typical 16 beam embodiment of this invention including an input beam 15, a power amplifier 15 and an output beam 15.

The output beam for each 2nd line of the output power divider, each connected to power amplifier 1 through 16, is connected, each through a different phase shifter, to the output beam 2. All these signals, from power amplifer 1 through 16, after each phase shifter, travel through equal length lines arriving at output beam 2. These equal length lines can end opposite to input beam 15, as shown in FIG. 3, or they can end oppsite to input beam 2 or anywhere in between them.

Similarly, each output beam 3 through 16 can be connected as shown or each output beam can be positioned opposite to its input beam or anywhere in between them. There is a complete flexibility in positioning the output beam in relation to its input beam.

Figure 18:
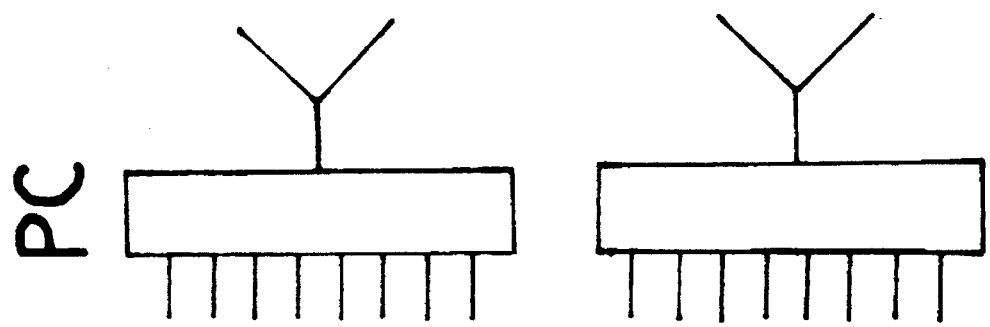
FIG. 18 is a schematic diagram showing a method reducing the number of feed elements by sub sets or sub clustering.

It may be necessary to reduce the feed elements for a number of reasons. One of them being the availability of physical space. One embodiment using sub set or sub cluster is shown in FIG. 18. Here 8 input lines are combined and the output is one feed line. For 16 output lines, only two feed elements are shown. The sub set could be made of four lines, providing altogether 4 feed elements per beam for the 16 beam system. Other combinations are made.

Figure 19:
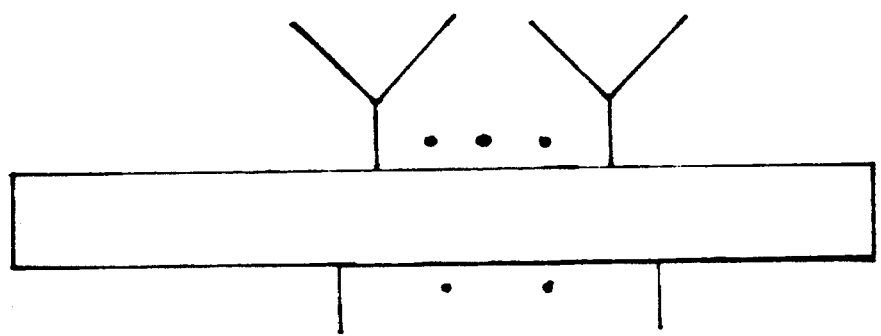
FIG. 19 is a schematic diagram showing a general method of reducing the number of feed elements.

Another embodiment is shown in FIG. 19 where the input is 1, 2 . . . n lines the output of which is combined. The output is 1, 2 . . . m lines where m is less than n.

In another embodiment of this invention is a portion or the entire system is implemented in a monolithic microwave integrated circuit (MMIC) technology. Another objective of this invention is to use a conductive deposition of a film of single crystal high Tc superconductor, such as YBCO, TBCCO, for a portion or the entire system and operate the system at a high superconducting temperature, currently between 75 and 105 degrees Kelvin, and thus reduce the conductive losses of the system. U.S. Pat. No. 5,409,889 includes a MMIC high Tc superconducting microwave device.

Another embodiment is a very low conductive loss high Tc superconductive waveguide multibeam transmitters. All the components, in the waveguide embodiment, are made of a single crystal high Tc superconductor such as YBCO, TBCCO. The waveguide feed elements and the reflector antenna are also made of a single crystal high Tc superconductor including YBCO, TBCCO. In another waveguide embodiment, all the components, including waveguide feed elements are made of a single crystal dielectric material, such as sapphire, lanthanum aluminate, having interior surfaces which are deposited with a film of a single crystal high Tc superconductor such as YBCO, TBCCO. The reflector antenna is also made of a single crystal dielectric material such as sapphire, lanthanum aluminate, having reflecting surfaces which are deposited with a film of a single crystal high Tc superconductor. The high Tc superconducting transmitters are operated at a high superconducting temperature currently above 77 degrees K. A Q of one million, for high Tc superconducting microwave devices, has been demonstrated. G. Sheri, C. Wilker, P. Pang and W. C. Holstein, "High Tc Suoerconducting-sapphire Microwave resonator with Extremely High Q-values up To 90 K," IEEE MTT-S, Digest, pp. 193–196, 1992. U.S. Pat. Nos. 5,407,904 and 5,407,905 have been issued on high Tc superconducting microwave devices.

It should be understood that the foregoing disclosure relates to only typical embodiments of this invention and that numerous modifications or alternatives may be made therein, by those of ordinary skill, without departing from the spirit and scope of this invention as set forth in the appended claims. The invention includes different number of beams, all RF, microwave and millimeter wave frequencies, all waveguide embodiments, coaxial embodiments, microstrip embodiments, MMIC embodiments, use of multilayer boards, combination of waveguide, coaxial, microstrip, embodiments, different types of connecting input and output lines, different types of feed elements, different types of fixed phase shifters, different types of switches including semiconductor and ferroelectric switches.

What is claimed is:

1. An efficient satellite multibeam equally loaded transmitters containing input beams, input beam power dividers, phase shifters connected to input power dividers, power combiners connected to each power amplifier input, lines connecting input power divider of each input to the power combiner connecting each amplifier, power amplifiers, switches, phase shifters connected to each switch connected to each power amplifier, feed elements, lines connecting switches at the output of each power amplifer to each feed element, reflector antenna, output beams and comprised of;

an input beam;

an input power divider, the number of outputs being equal to the number of amplifiers, being connected to said input beam;

a part of a first set of phase shifters each being connected to each line of said input power divider;

a power amplifier 1;

a power combiner being connected to said power amplifier 1 and its one line being connected to the top of the first set of phase shifters through a connecting line;

an output switch, having a number of outputs equal to the number of output beams, being connected to said power amplifier 1;

a part of a second set of phase shifters each being connected to each line of said switch;

a reflector antenna;

an output beam 1;

a number of feed elements, being equal to the number of amplifiers, for said beam 1, located at or near the focal plane of said reflector antenna, forming one shaped beam;

one of a second set of lines connecting to the top of the 2nd set of phase shifters to one said feed element of said output beam 1;

input beams 2 through n;

input power dividers 2 throuh n, each 1 to n way zero phase shift, each connected to each said input beam;

a first set of input phase shifters, 1 through n×n, each being connected sequentially, one after another, to each line of said input power dividers;

a first set of connecting lines 2×2 through n×n;

power amplifiers 2 through n;

power combiners, 2 through n, each being connected to the input of each said power amplifier at one end and the other end being connected to each said input phase shifter, through a first set of connecting lines;

output switches, 2 through n, each being connected, at one end, to each said power amplifiers;

a second set output phase shifters, 1 through n×n, each being connected to each line of said each switch;

feed elements, 2×2 through n×n, each being located at or near a focal plane of said reflector antenna;

each output beam containing 2 through n element;

a second set of lines connecting each of said second set of phase shifters to each feed element;

one line of each output switch being connected to one feed element of one beam through one of a said second set of phase shifters;

output beams 2 through n corresponding to its input beam only;

said feed elements, 2 through n located at or near a focal plane of said reflector antenna, form one shaped beam; and said input beams, said input power dividers, said first set of phase shifters, said first set of input connecting lines, said power combiners, said power amplifiers, said output switches, said second set of phase shifters, said output connecting lines, and said feed elements are connected together to produce each single output beam corresponding to each one input beam.

2. An efficient satellite multibeam equally loaded transmitters containing input beams, input beam power dividers, phase shifters connected to input power dividers, power combiners connected to each power amplifier input, lines connecting input power divider of each input to the power combiner connecting each amplifier, power amplifiers, switches, phase shifters connected to each switch connected to each power amplifier, feed elements, lines connecting switches at the output of each power amplifer to each feed element, reflector antenna, output beams of claim 1;

wherein said multibeam transmitters being comprised of waveguides.

3. An efficient satellite multibeam equally loaded transmitters containing input beams, input beam power dividers, phase shifters connected to input power dividers, power combiners connected to each power amplifier input, lines connecting input power divider of each input to the power combiner connecting each amplifier, power amplifiers, switches, phase shifters connected to each switch connected to each power amplifier, feed elements, lines connecting switches at the output of each power amplifer to each feed element, reflector antenna, output beams of claim 2;

wherein the waveguides of said multibeam transmitters being comprised of a high Tc single crystal superconductor;

said feed elements being comprised of a single crystal high Tc superconductor; and said multibeam transmitters being operated at a high superconducting temperature.

4. An efficient satellite multibeam equally loaded transmitters containing input beams, input beam power dividers, phase shifters connected to input power dividers, power combiners connected to each power amplifier input, lines connecting input power divider of each input to the power combiner connecting each amplifier, power amplifiers, switches, phase shifters connected to each switch connected to each power amplifier, feed elements, lines connecting switches at the output of each power amplifer to each feed element, reflector antenna, output beams of claim 2;

wherein the waveguides of said multibeam transmitters being comprised of a single crystal dielectric material having interior surfaces which are deposited with a film of a single crystal high Tc superconductor;

said feed elements being comprised of a single crystal dielectric material having inner surfaces which being deposited with a film of a single crystal high Tc superconductor; and said multibeam transmitters being operated at a high superconducting temperature.

5. An efficient satellite multibeam equally loaded transmitters containing input beams, input beam power dividers, phase shifters connected to input power dividers, power combiners connected to each power amplifier input, lines connecting input power divider of each input to the power combiner connecting each amplifier, power amplifiers, switches, phase shifters connected to each switch connected to each power amplifier, feed elements, lines connecting switches at the output of each power amplifer to each feed element, reflector antenna, output beams of claim 3;

wherein said reflector antenna being comprised of a single crystal high Tc superconductor having a Q of 1 million at microwave frequencies.

6. An efficient satellite multibeam equally loaded transmitters containing input beams, input beam power dividers, phase shifters connected to input power dividers, power combiners connected to each power amplifier input, lines connecting input power divider of each input to the power combiner connecting each amplifier, power amplifiers, switches, phase shifters connected to each switch connected to each power amplifier, feed elements, lines connecting switches at the output of each power amplifer to each feed element, reflector antenna, output beams of claim 4;

wherein said reflector antenna being comprised of a single crystal dielectric material having reflecting surfaces which being deposited with a film of a single crystal high Tc superconductor having a Q of 1 million.

7. A monolithic, efficient satellite multibeam equally loaded transmitters containing input beams, input beam power dividers, phase shifters connected to input power dividers, power combiners connected to each power amplifier input, lines connecting input power divider of each input to the power combiner connecting each amplifier, power amplifiers, switches, phase shifters connected to each switch connected to each power amplifier, feed elements, lines connecting switches at the output of each power amplifer to each feed element, reflector antenna, output beams of claim 1;

wherein said input power dividers, a set of input first phase shifters, power combiners, power amplifiers, switches, a set of output phase shifters being MMIC.

8. A monolithic, efficient satellite multibeam equally loaded transmitters containing input beams, input beam power dividers, phase shifters connected to input power dividers, power combiners connected to each power amplifier input, lines connecting input power divider of each input to the power combiner connecting each amplifier, power amplifiers, switches, phase shifters connected to each switch connected to each power amplifier, feed elements, lines connecting switches at the output of each power amplifer to each feed element, reflector antenna, output beams of claim 7;

wherein the conducting depositions of said microstrip lines being comprised of a film of a single crystal high Tc superconductor; and said multibeam transmitters being operated at high superconducting temperature.

* * * * *